United States Patent [19]
Ginosar et al.

[11] Patent Number: 6,144,526
[45] Date of Patent: Nov. 7, 2000

[54] DISK CARTRIDGE FOR USE WITH A REMOVABLE CARTRIDGE DATA STORAGE DRIVE

[75] Inventors: David M. Ginosar, Ogden; Mark S. Thayne, West Point; Yiping Ma, Layton; Clark C. Bruderer, Farmington, all of Utah

[73] Assignee: Iomega Corporation, Roy, Utah

[21] Appl. No.: 09/038,908

[22] Filed: Mar. 12, 1998

Related U.S. Application Data

[63] Continuation of application No. 08/337,678, Nov. 10, 1994, Pat. No. 5,854,719, which is a continuation-in-part of application No. 08/324,671, Oct. 18, 1994, abandoned.

[51] Int. Cl.[7] ................................................ G11B 23/03
[52] U.S. Cl. ............................................................ 360/133
[58] Field of Search ................................ 360/133; 369/291, 369/77.2

[56] References Cited

U.S. PATENT DOCUMENTS

| | | | |
|---|---|---|---|
| 4,419,703 | 12/1983 | Gruczelak et al. | 360/97 |
| 4,445,157 | 4/1984 | Takahashi | 360/133 |
| 4,514,771 | 4/1985 | Stark et al. | 360/73 |
| 4,571,646 | 2/1986 | Bauck | 360/99 |
| 4,581,669 | 4/1986 | Tsuji et al. | 360/97 |
| 4,600,866 | 7/1986 | Seto | 318/313 |
| 4,644,426 | 2/1987 | Saito | 360/71 |
| 4,656,542 | 4/1987 | Shibata | 360/97 |
| 4,658,307 | 4/1987 | Tsuyuguchi et al. | 360/69 |
| 4,683,506 | 7/1987 | Toldi et al. | 360/105 |
| 4,733,314 | 3/1988 | Ogawa et al. | 360/97 |
| 4,953,042 | 8/1990 | Yoshikawa | 360/96.5 |
| 4,965,682 | 10/1990 | Jinnai et al. | 360/73.03 |
| 4,965,685 | 10/1990 | Thompson et al. | 360/97.01 |
| 5,025,436 | 6/1991 | Crain et al. | 369/77.2 |
| 5,062,093 | 10/1991 | Christie et al. | 369/77.2 |
| 5,072,317 | 12/1991 | Fukushima et al. | 360/71 |
| 5,117,315 | 5/1992 | Nagasaki et al. | 360/71 |
| 5,162,959 | 11/1992 | Arin et al. | 360/97 |
| 5,204,793 | 4/1993 | Plonczak | 360/97.01 |
| 5,218,503 | 6/1993 | Martin | 360/133 |
| 5,220,551 | 6/1993 | Tateishi et al. | 369/50 |
| 5,262,918 | 11/1993 | Tannert | 360/133 |
| 5,267,227 | 11/1993 | Nanke | 369/77.1 |
| 5,294,877 | 3/1994 | Cameron | 318/809 |
| 5,297,067 | 3/1994 | Blavkborox et al. | 360/137 |
| 5,317,464 | 5/1994 | Witt et al. | 360/90.08 |
| 5,386,406 | 1/1995 | Ikuma et al. | 369/77.2 |
| 5,386,407 | 1/1995 | Park | 369/77.2 |
| 5,493,192 | 2/1996 | Nihei et al. | 318/568.2 |
| 5,612,940 | 3/1997 | Otsuka et al. | 369/77.2 |

FOREIGN PATENT DOCUMENTS

| | | |
|---|---|---|
| 62-095701 | 2/1987 | Japan . |
| 02231876 | 8/1992 | Japan . |
| WO 88/06786 | 9/1988 | WIPO . |
| WO 93/18507 | 9/1993 | WIPO . |

OTHER PUBLICATIONS

Godwin, J., "An Introduction to the Insite 325 FLOPTICAL® Disk Drive", Optical Data Storage Topical Meeting, *SPIE*, 1989, vol. 1078..

Abstract of Japanese Application No. 55–57683 (Meidensha K.K.), published Nov. 28, 1981 as Publication No. 55–153993, entitled "Torque Calculating Device".

*Primary Examiner*—George J. Letscher
*Attorney, Agent, or Firm*—Woodcock Washburn Kurtz Mackiewicz & Norris LLP

[57] ABSTRACT

A disk cartridge adapted for insertion into a data storage device having an insertion opening, a spindle motor positioned to engage a hub of the disk cartridge, and a cartridge receiving stop having first and second receiving projections. The disk cartridge includes an outer casing having a top surface having a substantially flat middle region and angled peripheral regions; a substantially flat bottom surface defining an opening; a back wall having a rear peripheral edge; a front wall having a front peripheral edge; and side walls that each meet the front wall to form a plurality of non-square shaped front corners. When the disk is inserted into the data storage device, a first engaging projection formed on the front wall engages the first receiving projection of the cartridge receiving stop, a second engaging projection formed on the front wall engages the second receiving projection of the cartridge receiving stop, and the hub engages the spindle motor.

20 Claims, 19 Drawing Sheets

DISK CARTRIDGE FOR USE WITH A REMOVABLE CARTRIDGE DATA STORAGE DRIVE

CROSS-REFERENCE TO RELATED APPLICATIONS

This is a continuation of U.S. Application No. 08/337,678 filed Nov. 10, 1994, now U.S. Pat. No. 5,854,719, which is a continution-in-part of U.S. Patent Application No. 08/324, 671, filed Oct. 18, 1994 now abandoned.

BACKGROUND

1. Field of the Invention

The present invention relates to a removable disk cartridge and to a data storage device for receiving same. More particularly, the present invention relates to methods and apparatus for detecting the presence of the disk cartridge in the data storage device, and to a data storage device and disk cartridge adapted for use in the data storage device having means for protecting against the insertion of incompatible disk cartridges in the device.

2. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge. The outer shell of the cartridge typically has some form of opening near its forward edge to provide the recording heads of the drive with access to the recording surfaces of the disk. A shutter or door mechanism is often provided to cover the opening when the cartridge is not in use to prevent dust or other contaminants from entering the cartridge and settling on the recording surface of the disk.

Disk drives for receiving removable disk cartridges, including conventional 3.5" floppy disk drives, must have some mechanism for detecting the insertion or presence of a disk cartridge in the drive. The actuator that carries the recording heads of the disk drive across the recording surfaces of the disk should not be allowed to move unless the presence of a disk cartridge is detected. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present.

One problem with these prior art techniques is that the switch(es) used to detect the presence of a disk cartridge can be activated by foreign objects inserted into the drive, such as pencils, pens or other objects accidentally or deliberately inserted into the drive. As a result, the drive may assume that a disk cartridge is present and therefore release the actuator that carries the recording heads of the drive allowing the heads to move outward into the interior space of the drive. Damage to the recording heads of the drive can result from the heads colliding with any such foreign objects. Additionally, in disk drives that employ opposed heads that rely on the presence of a rotating recording medium to keep them apart, the heads could be damaged by colliding with themselves. Another disadvantage of using mechanical switches and the like to detect the presence of a disk cartridge is that the switches and associated hardware components increase the complexity of the disk drive, creating a greater risk of malfunction and increasing the cost of the drive. As the foregoing illustrates, there is a need for improved methods and apparatus for detecting the presence of a disk cartridge in a disk drive.

Another disadvantage of many prior art disk drives is that the insertion of incompatible disk cartridges in such a drive, i.e., cartridges not specifically intended for use in the drive, can initiate certain critical functions of the disk drive upon insertion into the drive. For example, an incompatible cartridge could cause the heads of the disk drive to "unlock" and potentially collide with the front of the incompatible cartridge causing damage. Additionally, the incompatible cartridge could cause the spindle motor of the disk drive to spin-up to speed, possibly causing further damage. Unlocking of the heads and rotation of the spindle motor should only be permitted when a disk cartridge specifically designed for use with the disk drive is properly inserted in the disk drive. Otherwise, damage to the disk drive spindle motor and read/write heads can occur. Accordingly, there is a further need for a disk drive, and a disk cartridge specifically adapted for use in the disk drive, that do not permit operation of these critical functions when an incompatible disk cartridge is inserted in the disk drive.

The methods and apparatus of the present invention satisfy the foregoing needs.

SUMMARY OF THE INVENTION

One aspect of the present invention is directed to methods and apparatus for detecting the presence of a disk cartridge in a disk drive. The present invention recognizes that the rotating media of a disk cartridge will place a certain load on the spindle motor of the disk drive, which is greater than the inherent load on the spindle motor in the absence of a disk cartridge. According to the present invention, the presence or absence of a disk cartridge in the disk drive is detected by (a) initiating rotation of the spindle motor of the disk drive; (b) obtaining a measure of load on the spindle motor; and (c) comparing the measure of load on the spindle motor to a threshold value. A cartridge is detected when the measured load exceeds the threshold value. In one embodiment, the measure of load on the spindle motor comprises a measure of the time the spindle motor takes to spin up to a predetermined operating speed after initiating rotation of the spindle motor. In a second embodiment, the measure of load on the spindle motor comprises a measure of the time the spindle motor takes to coast down to a predetermined operating speed from a first speed in excess of the predetermined operating speed. In a third embodiment, the measure of load on the spindle motor comprises a measure of the current drawn by a spindle motor controller/driver while driving the spindle motor at its predetermined operating speed. Finally, in a fourth embodiment, the measure of load on the spindle motor comprises a measure of the voltage applied to the coils of the spindle motor as the spindle motor rotates at its predetermined operating speed.

In a disk drive that employs a movable platform that moves from a forward position to a rearward position upon insertion of a cartridge into the disk drive, the steps of the various embodiments of the method of the present invention may be initiated upon detecting movement of the platform into the rearward position. Additionally, if no disk cartridge is detected in such a case, the method of the present invention may further comprise the step of moving the platform back to its forward position.

A disk drive in accordance with the present invention comprises a spindle motor positioned to engage a hub of a disk cartridge and to rotate a disk within the cartridge upon full insertion of the cartridge into the disk drive; a spindle motor controller/driver for initiating rotation of the spindle motor and for providing an indication of the speed of rotation of the spindle motor; and means for obtaining a measure of load on the spindle motor and for comparing the measure of load on the spindle motor to a hreshold value. Presence of a disk cartridge is detected hen the measure of load on the spindle motor satisfies the threshold value.

In one embodiment, the measure of load on the spindle motor comprises a measure of the time the spindle motor takes to spin up to a predetermined operating speed after initiating rotation of the spindle motor. In another embodiment, the measure of load on the spindle motor comprises a measure of the time the spindle motor takes to coast down to a predetermined operating speed from a first speed in excess of the predetermined operating speed. In each of these embodiments, the disk drive includes a timer responsive to the spindle motor controller/driver for generating a value indicative of the time the spindle motor takes to reach the predetermined operating speed.

In yet another embodiment, the measure of load on the spindle motor comprises a measure of the current drawn by a spindle motor controller/driver while driving the spindle motor at its predetermined operating speed. In this embodiment, the disk drive further comprises a current sensor coupled between a power supply of the disk drive and the spindle motor controller/driver for sensing the current drawn by the spindle motor controller/driver as it maintains the spindle motor at the predetermined operating speed. Preferably, the current sensor comprises a resistor coupled in series between the power supply and a power input of the spindle motor controller/driver, and an amplifier coupled across the resistor and adapted to amplify any voltage across the resistor. The magnitude of the amplified voltage represents the magnitude of the current drawn by the spindle motor controller/driver.

In a fourth embodiment, the measure of load on the spindle motor comprises a measure of the voltage applied to the coils of the spindle motor as the spindle motor rotates at its predetermined operating speed. In this embodiment, the disk drive includes a voltage sensor coupled to the spindle motor controller/driver for obtaining a measure of the voltage applied by the spindle motor controller/driver to the spindle motor coils in order to maintain the spindle motor at its predetermined operating speed.

The disk drive may further comprise a switch and a platform that moves from a forward position to a rearward position upon insertion of a disk cartridge into the disk drive. The platform activates the switch when it moves into its rearward position. Activation of the switch can be used to trigger the cartridge detection steps of the present invention. Preferably, the spindle motor controller/driver comprises a commutation timing circuit to provide the indication of the spindle motor speed. The indication may take the form of a tachometer signal wherein the frequency of the signal indicates the speed of rotation of the spindle motor.

According to another aspect of the present invention, a data storage device for receiving a disk cartridge having non-square front corners comprises a spindle motor adapted to engage a hub of the disk cartridge for rotating a disk within the cartridge at a pre-determined operating speed, and a cartridge receiving stop having a substantially flat middle surface disposed in fixed relation to the spindle motor. The cartridge receiving stop has angled outer edges that extend outward from the substantially flat middle surface of the stop toward an insertion opening of the disk drive at a predetermined angle. The substantially flat middle surface of the stop being adapted to engage the front peripheral edge of the disk cartridge upon insertion of the disk cartridge into the data storage device and to position the disk cartridge such that the hub of the cartridge is aligned with the spindle motor. According to an important feature of the present invention, the angled outer edges of the cartridge receiving stop serve to impede the insertion of an incompatible cartridge into the disk drive and to ensure that the hub of such an incompatible disk cartridge does not align with the spindle motor of the disk drive.

A disk cartridge in accordance with this aspect of the present invention comprises an outer casing having a substantially flat front peripheral edge and opposite front corners, and a recording disk rotatably mounted on a hub with the casing. Each of the front corners have a non-square shape adapted to avoid interference with the angled outer edges of the cartridge receiving stop of the data storage device so that, upon insertion of the disk cartridge into the data storage device, the front peripheral edge of the disk cartridge reaches the substantially flat middle surface of the cartridge receiving stop. This allows the hub of the disk cartridge to align with the spindle motor in the data storage device.

According to yet another aspect of the present invention, the data storage device further comprises means for enabling a function of the data storage device. The enabling means includes an operating member disposed on the substantially flat middle surface of the cartridge receiving stop. The particular function is enabled upon contact by the operating member with the front peripheral edge of a disk cartridge inserted into the data storage device.

A disk cartridge in accordance with this further aspect of the present invention comprises a projection formed on the front peripheral edge of the cartridge and adapted to engage the operating member of the enabling means. An incompatible disk cartridge will collide with the angled outer edges of the cartridge receiving stop and therefore will not contact the operating member. As such, the incompatible cartridge will not enable the particular function.

In one embodiment, the enabling means comprises an enabling lever adapted to enable unlocking of a head actuator. In another embodiment, the enabling means comprises an enabling lever adapted to enable movement of a platform within the disk cartridge. In yet another embodiment, the enabling means comprises a switch coupled to a processor that enables certain disk drive functions only upon activation of the switch.

The foregoing and other objects, features and advantages of the invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENTS

Figure 1:
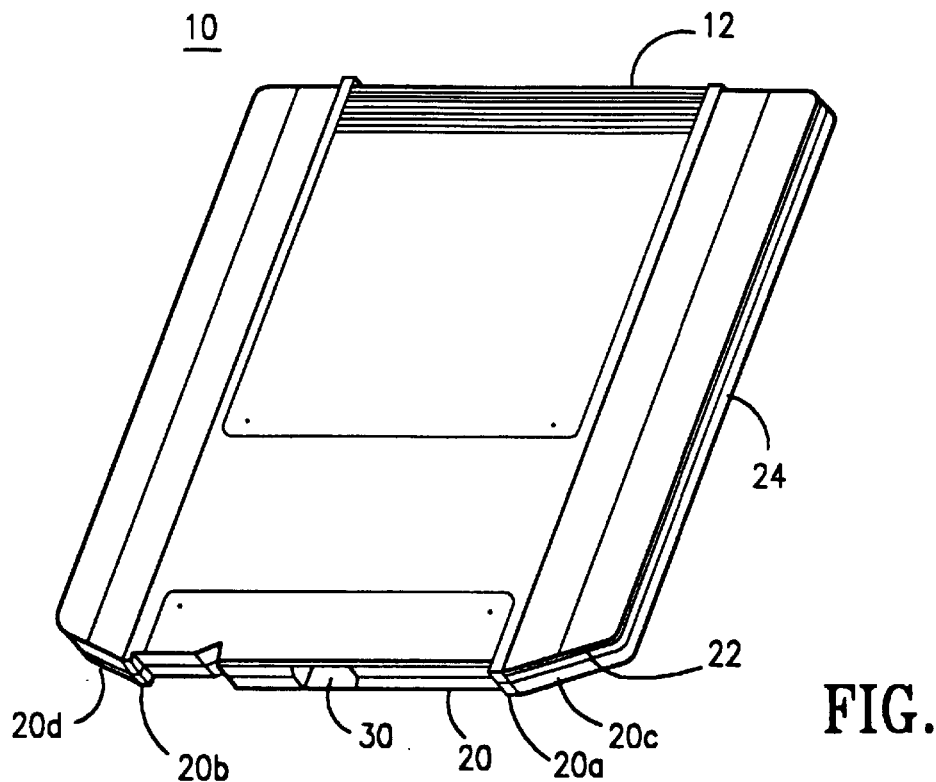
FIG. 1 is perspective view of an exemplary disk cartridge.
Figure 2:
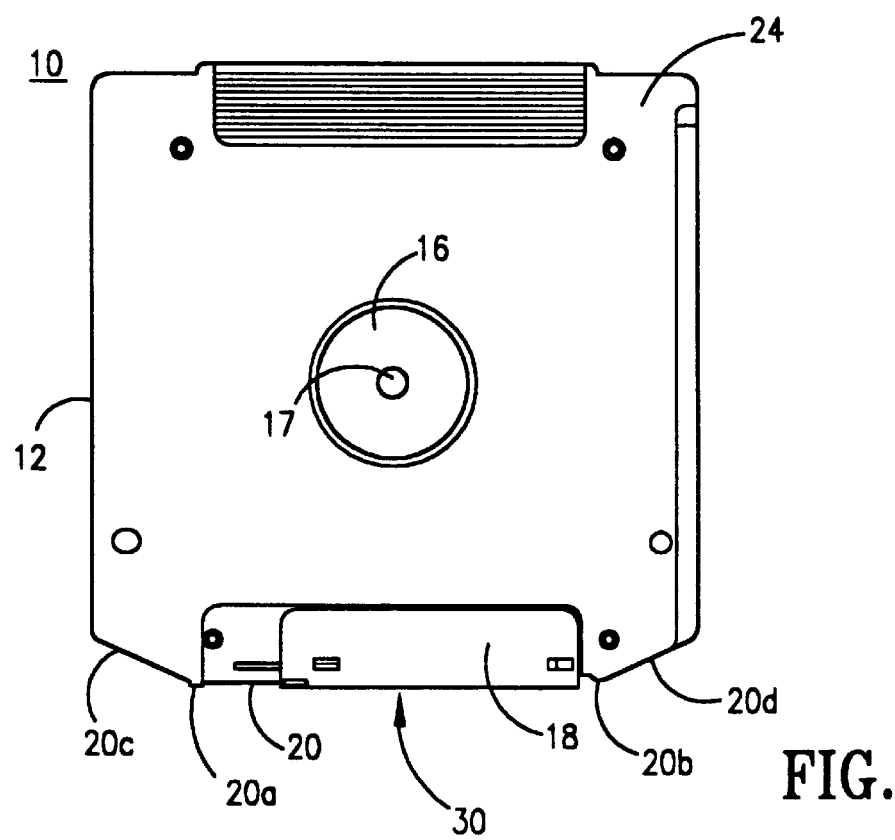
FIG. 2 is a bottom view of the disk cartridge of FIG. 1.

Referring to the drawings wherein like numerals indicate like elements throughout, there is shown in FIGS. 1 and 2 a disk cartridge 10 in accordance with a preferred embodiment of the present invention. As shown, the disk cartridge 10 comprises an outer casing 12 having upper and lower-shells 22, 24 that mate to form the casing. A disk-shaped recording medium 14 is affixed to a hub 16 that is rotatably mounted in the casing 12. An opening 21 on the bottom shell 24 of the casing 12 provides access to the disk hub 16. A head access opening 30 in the front peripheral edge 20 of the disk cartridge 10 provides access to the recording surfaces of the disk 14 by the recording heads of a disk drive, described hereinafter. A shutter (not shown) is provided on the front peripheral edge 20 of the disk cartridge 10 to cover the head access opening 30 when the cartridge is not in use. When the cartridge is inserted into the disk drive, the shutter moves to the side exposing the head access opening 30 and thereby providing the heads of the drive with access to the recording surface of the disk. In the present embodiment, the casing houses a flexible or floppy magnetic disk, however, in other embodiments, the disk may comprise a rigid magnetic disk, a magneto-optical disk or an optical storage medium.

For purposes described hereinafter, the opposite front corners 20c, 20d of the disk cartridge 10 have a non-square shape, i.e., the sides and front peripheral edge of the cartridge 10 do not form right angles at the opposite corners 20c, 20d. In the preferred embodiment, the opposite corners 20c, 20d of the disk cartridge 10 angle away from the front peripheral edge 20 of the disk cartridge 10 toward the rear end 12b at a predetermined angle, θ. A pair of raised surfaces or projections 20a, 20b are formed on the front peripheral edge 20 of the cartridge. Each projection 20a, 20b is formed adjacent a respective one of the angled corners 20c, 20d at the point where the non-square corner 20c, 20d begins to angle away from the front peripheral edge 20.

Figure 3:
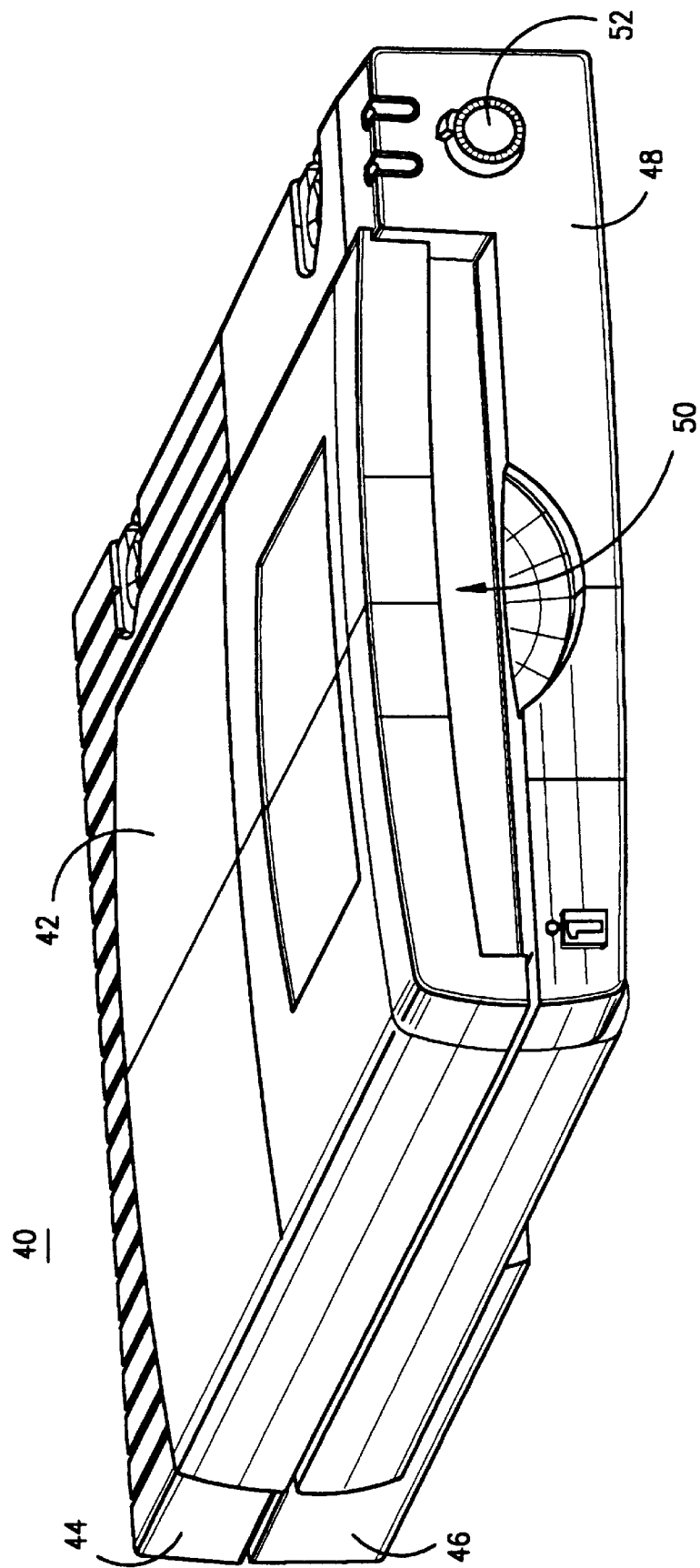
FIG. 3 is a perspective view of a disk drive in accordance with the present invention.

FIG. 3 shows a data storage device, or disk drive 40, for receiving the disk cartridge 10 of FIGS. 1 and 2 in accordance with a preferred embodiment of the present invention. The disk drive 40 comprises an outer housing 42 having top and bottom covers 44, 46 and a front panel 48. A disk cartridge can be inserted into the disk drive 40 through a horizontal opening 51 in the front panel 48 of the disk drive 40. An eject button 52 is also provided on the front panel 48 for automatically ejecting the disk cartridge 10 from the disk drive 40. The disk drive 40 can be employed as a stand-alone unit, or alternatively, can employed as an internal disk drive of a computer (not shown).

Figure 4:
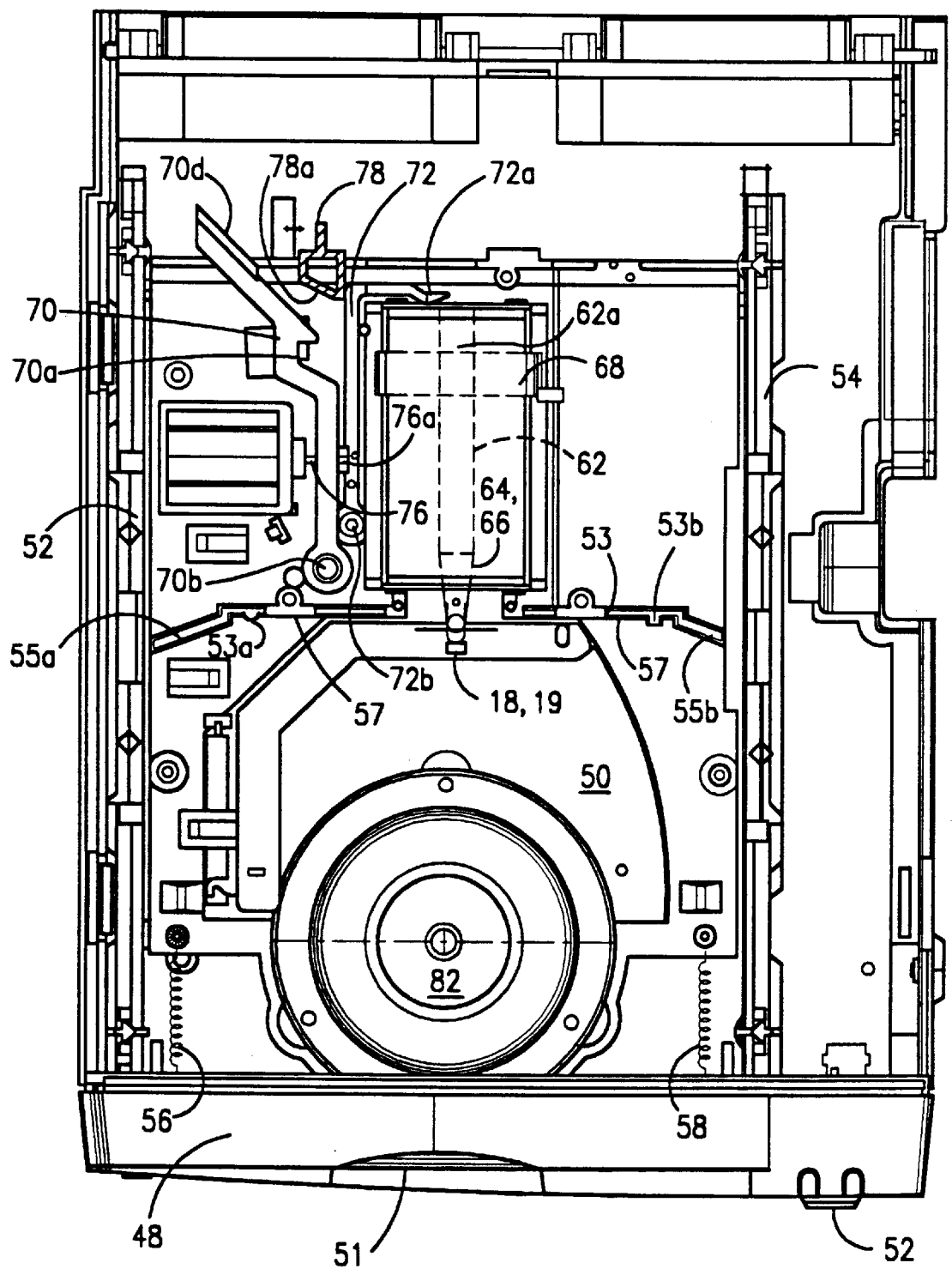
FIG. 4 is a top cut-away view of the disk drive of FIG. 3.
Figure 6:
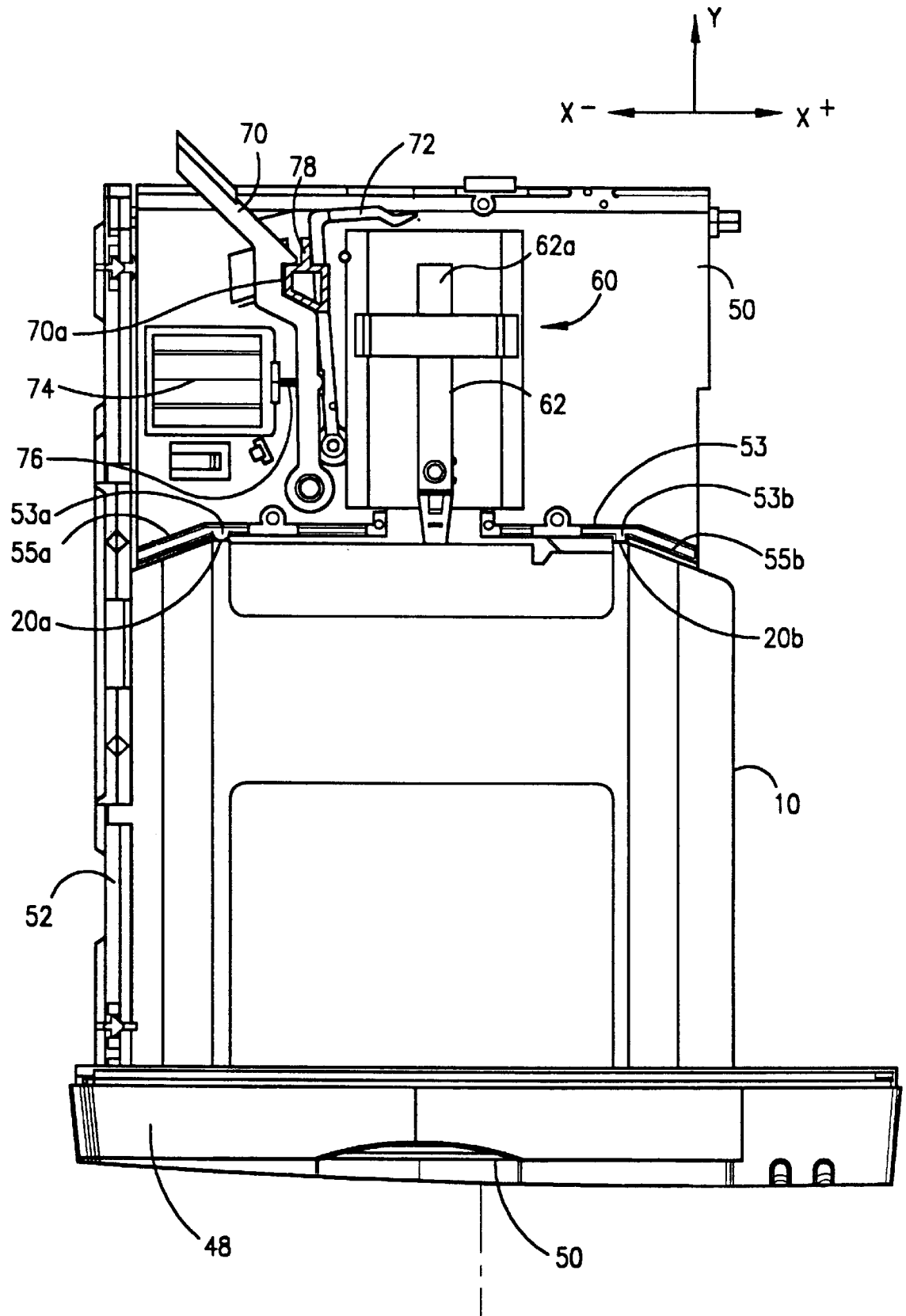

FIG. 4 is a top view of the disk drive 40 of the present invention with the top cover 44 removed. The disk drive 40 comprises an internal platform 50 that slides along opposing side rails 52, 54 between a forward position (FIG. 4) and a rearward position (FIG. 6). A pair of springs 56, 58 bias the platform 50 in its forward position.

A linear actuator 60 is mounted on the rear of the platform 50. The linear actuator 60 comprises a carriage assembly 62 having two lightweight flexible arms 64, 66. The recording heads 18, 19 of the disk drive are mounted at the ends of the respective arms 64, 66. A coil 66, which is part of a voice coil motor, is mounted at the opposite end of the carriage 62. The coil 68 interacts with magnets (not shown) to move the carriage linearly so that the heads 18 and 19 can move radially over respective recording surfaces of a disk cartridge inserted into the disk drive. Additional details of the linear actuator 60 are provided in co-pending application Ser. No. 08/324,599, filed Oct. 18, 1994, entitled "Actuator for Data Storage Device", which is incorporated herein by reference.

An eject latch lever 70 is pivotally mounted on the platform 50 about a rotation shaft 70b. A first spring (not shown) is coupled to the lever 70 at the rotation shaft 70b in order to bias the lever 70 in the $X^+$ direction. The eject latch lever 70 has a cutout 70a adapted to releasably engage a latch projection 78 as the platform 50 moves backward into its rearward position (see FIG. 6). The biasing force of the first spring 90 urges the eject latch lever 70 into this latched position. In the preferred embodiment, the latch projection 78 is formed as part of the inside top cover 44 (not shown) of the disk drive 40.

A head locking lever 72 is also pivotally mounted on the platform 50 about a rotation shaft 72b. A second spring (not shown) is coupled to the head locking lever 72 at its rotation shaft 72b also to bias the head locking lever 72 in the $X^+$ direction. An end 72a of the head locking lever, which extends at a right angle to the main shaft of the lever 72, is adapted to releasably engage an end 62a of the actuator carriage 62 when the carriage 62 is in a fully retracted position, thereby locking the carriage in place and preventing inadvertent movement of the recording heads 18, 19.

A single electromechanical device, which in the preferred embodiment comprises a solenoid 74, is mounted on the platform 50 and has a drive shaft 76. When the solenoid 74 is energized by an electrical current, the drive shaft 76 moves in the $X^-$ direction from a normally extended position toward a retracted position. As the drive shaft 76 of the solenoid 74 moves toward its retracted position, an enlarged operating end 76a of the drive shaft 76 engages the eject latch and head locking levers 70, 72 in order to pull the levers in the $X^-$ direction against their normal spring bias. Movement of the head locking lever 72 in the $X^-$ direction causes the end 72a of the head locking lever 72 to disengage from the end 62a of the carriage 62, thereby unlocking the actuator and allowing the actuator to move radially of the rotating disk 14. Similarly, movement of the eject latch lever 70 in the $X^-$ direction causes the cutout 70a on the eject latch lever to disengage from the latch projection 78 thereby releasing the platform 50 and allowing the platform 50 to move back to its forward position (FIG. 4). Operation of the solenoid 74 and the levers 70, 72 is described in greater detail in co-pending application Ser. No. 08/324,808, filed Oct. 18, 1994, entitled "Apparatus for Performing Multiple Functions in a Data Storage Device Using a Single Electro-Mechanical Device", which is incorporated herein by reference.

The disk drive 40 further comprises a spindle motor 82 capable of rotating the recording disk 14 of the disk cartridge 10 at a predetermined operating speed. In the present embodiment, the spindle motor 82 is coupled to the platform 50. As described hereinafter, when a disk cartridge is inserted into the disk drive, the hub 16 of the disk cartridge engages the spindle motor 82 of the disk drive 40 when the platform 50 reaches its rearward position.

A raised wall 53 is formed on the platform 50 in fixed relation to a spindle motor 82. The raised wall 53 extends across the width of the platform 50, perpendicularly to the direction of motion of the carriage 62. The raised wall 53 defines a cartridge receiving stop that serves to position the disk cartridge 10 on the platform 50 such that the hub 16 of the disk cartridge is aligned with the spindle motor 82 of the disk drive. As described hereinafter in greater detail, the cartridge receiving stop 53 has a substantially flat middle surface 57 disposed in fixed relation to the spindle motor 82 and a pair of angled outer edges 55a, 55b that extend outward from the substantially flat middle surface 57 of the stop 53 toward the insertion opening 51 of the disk drive at a pre-determined angle $\mu$. Preferably, the angle $\mu$ is substantially the same as the angle $\theta$ of the non-square corners 20c, 20d of the disk cartridge 10 of FIGS. 1 and 2. The substantially flat middle surface 57 of the cartridge receiving stop 53 has a pair of projections 53a, 53b positioned near the angled outer edges 55a, 55b.

Figure 5:
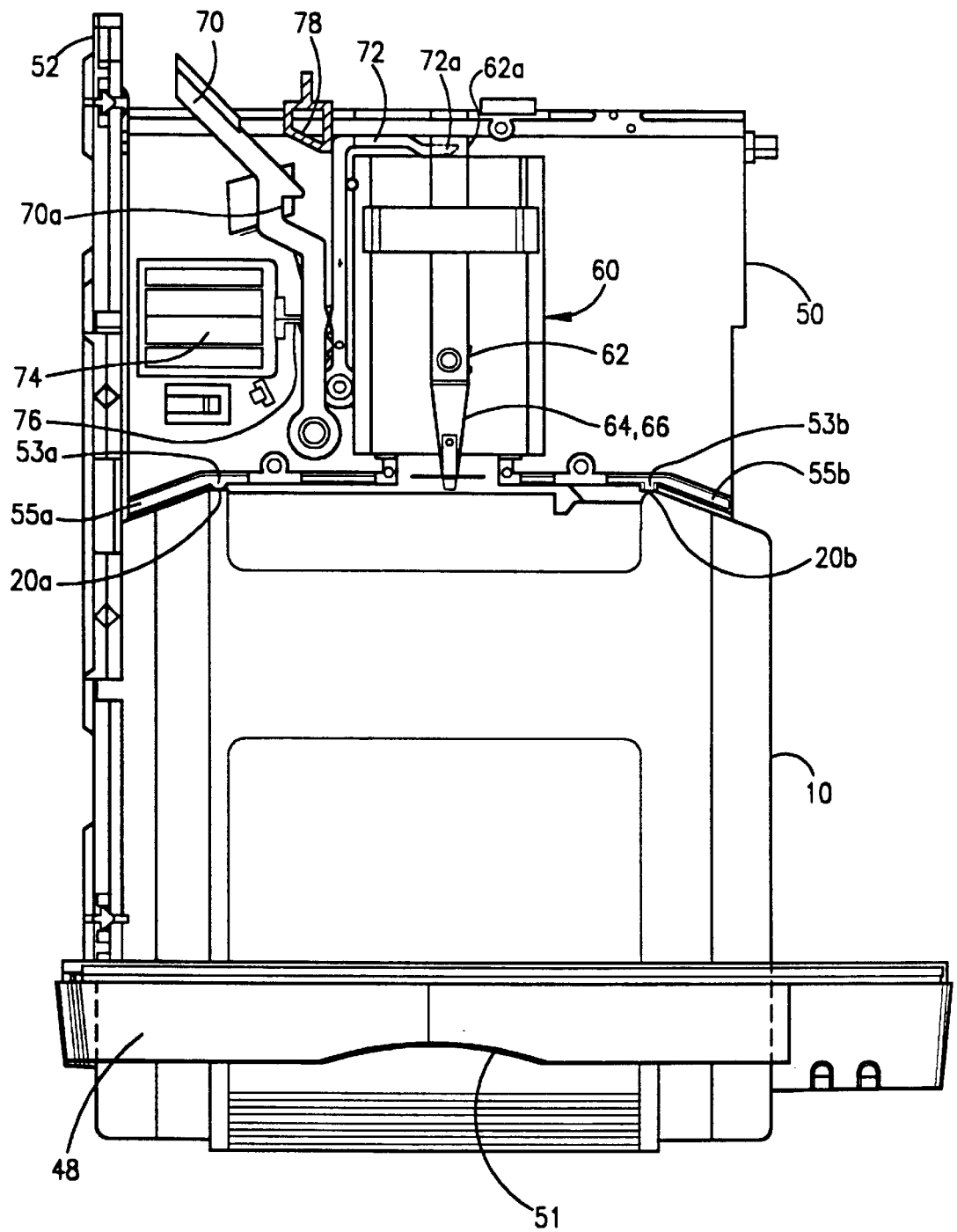
FIGS. 5 and 6 are top cut-away views of the disk drive of FIG. 4 illustrating the insertion of a disk cartridge into the disk drive.

FIGS. 5 and 6 illustrate the insertion of a disk cartridge 10 into the disk drive 40. For purposes of illustration only, some components of the disk drive 40 are not shown. Referring to FIG. 5, a disk cartridge 10 is inserted into the disk drive 40 through the opening 51 in the front panel 48 of the disk drive 40. Initially, the platform 50 is in its forward position, as shown. As the disk cartridge 10 is pushed farther into the disk drive 40, the pair of projections 20a, 20b on the front peripheral edge 20 of the cartridge 10 engage the corresponding pair of projections 53a, 53b on the substantially flat middle surface 57 of the cartridge receiving stop 53. Thereafter, the disk cartridge 10 and platform 50 move together rearwardly against the biasing force of the springs 56, 58 (FIG. 4).

The platform 50 rides in slots (not shown) along the opposing side rails 52, 54. The slots (not shown) in the opposing side rails 52, 54 are contoured such that, as the platform 50 and disk cartridge 10 move rearwardly, the elevation of the platform 50 changes. Specifically, the platform 50 rises in order to bring the spindle motor 82 of the disk drive 40 into engagement with the hub 16 of the disk cartridge 10. Engagement of the hub 16 and spindle motor 82 is completed when the platform 50 reaches its final rearward position (FIG. 6).

Figure 7:
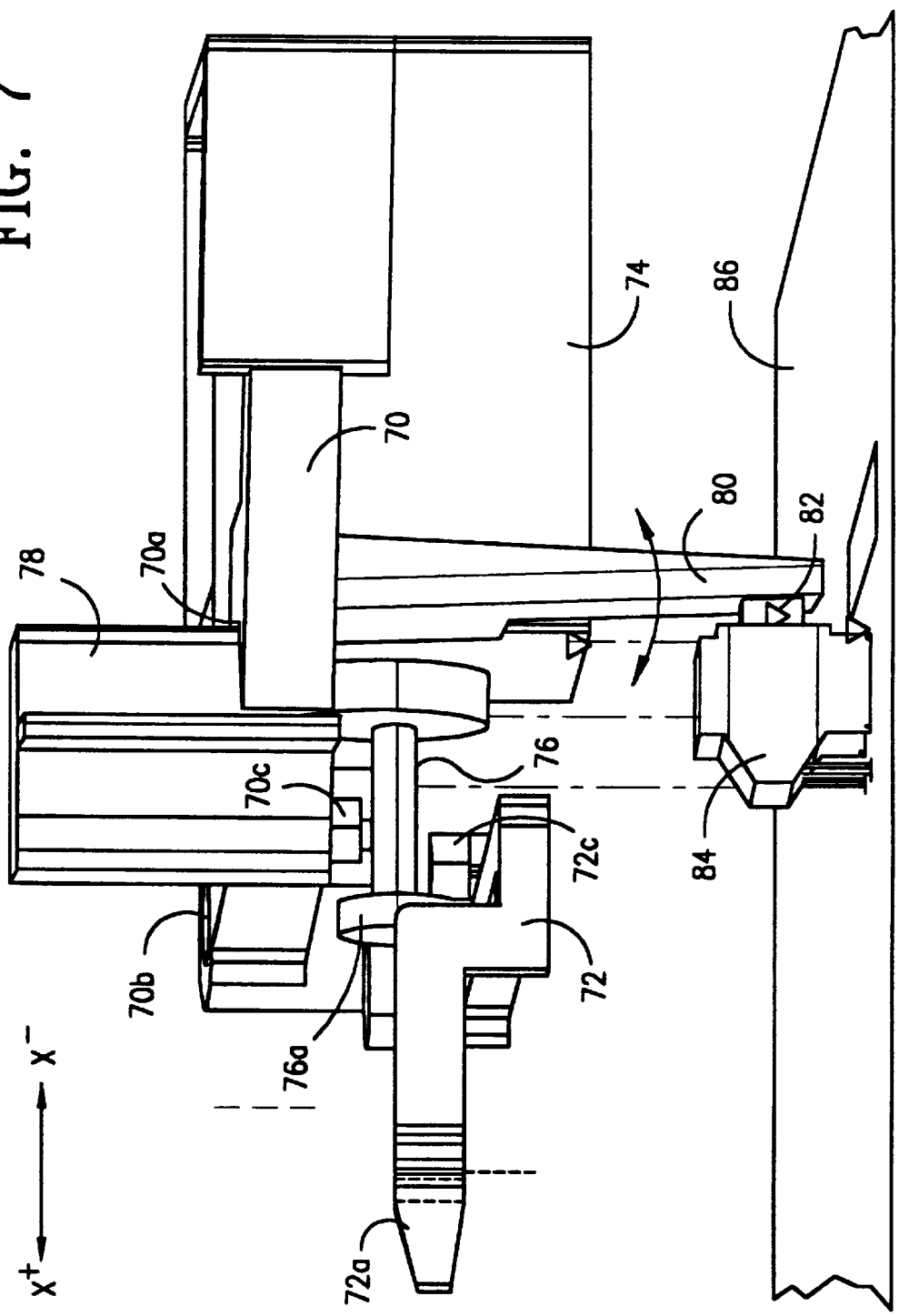
FIG. 7 illustrates further details of a portion of the disk drive of FIG. 3.

As the platform 50 approaches its rearward position, the portion of the eject latch lever 70 just rearward of the cutout 70a contacts an angled surface 78a of the latch projection 78. As the disk cartridge 10 pushes the platform 50 farther to the rear of the disk drive, the eject latch lever 70 rides along the angled surface 78a pushing the eject latch lever 70 to the side (i.e., $X^-$ direction) against its normal spring bias. As shown in FIG. 7, when the platform reaches its full rearward position, the eject latch lever 70 springs back in the $X^+$ direction such that the cutout 70a engages the latch projection 78. This latches the platform 50, and hence the eject member 53, in its rearward position and maintains the disk cartridge 10 in the disk drive 40. In this manner, the eject latch lever is said to be self-latching.

It is understood that in other embodiments, the cartridge receiving stop 53 may be formed separately from the platform 50. In other embodiments, the cartridge receiving stop 53 may be positioned more toward the rear of the disk rive, and the platform 50 may be omitted. The present invention, as defined by the appended claims, is intended to cover all such embodiments.

FIG. 7 is a rear end view of the disk drive 40 illustrating the latched position of the eject lever 70. As shown, the eject lever 70 has an elongate, downwardly extending projection 80 that extends downwardly from the lever 70 toward a circuit board 86 mounted on the bottom cover 46 of the disk drive housing. A switch 84 having a plunger 82 is mounted on the circuit board 86. When the platform 50 reaches the rearward position and the cutout 70a engages the latch projection 78, the projection 80 extending from the eject lever 70 will move against the plunger 82 thereby activating the switch 84. A processor (not shown) in the disk drive can sense the activation of the switch 84 and be alerted that the platform 50 has moved into the latched, rearward position. The processor can then initiate rotation of the spindle motor 82 and can signal the solenoid 74 to move the head locking lever 72 and release the linear actuator.

When it is desired to eject the disk cartridge 10 from the disk drive 40, the eject button 52 on the front panel 48 of the disk drive 40 is pushed. A processor (not shown) in the disk drive detects the activation of the eject button and causes a current to be applied to the solenoid 74. The drive shaft 76 of the solenoid 74 engages with the eject lever 70 pulling the eject lever 70 in the $X^-$ direction. As a result, the cutout 70a on the eject lever 70 disengages from the latch projection 78 releasing the platform 50. Once released, the platform 50 moves under the force of springs 56, 58 back to its forward position. As the platform 50 moves back to the forward position, the disk cartridge 10 is backed out of the opening 51 and can then be removed by a user.

As explained in the Background section, it is possible that a foreign object, such as a pencil, pen or some other incompatible disk cartridge, may be inserted into the disk drive in such a way that the platform 50 is moved backward into its latched, rearward position thereby activating the switch 84. It is also possible that the platform 50 could slip into the rearward position as a result of an accidental jolt to the disk drive. In such cases, it would be undesirable to release the carriage of the linear actuator because the heads 18, 19 could collide with the foreign object and/or themselves causing damage to the heads and/or linear actuator. One aspect of the present invention provides improved methods for detecting the presence of a disk cartridge in the disk drive. Only after a disk cartridge is detected will the processor release the carriage 62.

The rotating media of a disk cartridge will place a certain load on the spindle motor, which is greater than the inherent load on the spindle motor in the absence of a disk cartridge. According to one aspect of the present invention, the presence or absence of a disk cartridge in the disk drive is detected by (a) initiating rotation of the spindle motor of the disk drive; (b) obtaining a measure of load on the spindle motor; and (c) comparing the measure of load on the spindle motor to a threshold value. A cartridge is detected when the measured load exceeds the threshold value. In one embodiment, the measure of load on the spindle motor comprises a measure of the time the spindle motor takes to spin up to a predetermined operating speed after initiating rotation of the spindle motor. In a second embodiment, the measure of load on the spindle motor comprises a measure of the time the spindle motor takes to coast down to a predetermined operating speed from a first speed in excess of the predetermined operating speed. In a third embodiment, the measure of load on the spindle motor comprises a measure of the current drawn by a spindle motor controller/driver while driving the spindle motor at its predetermined operating speed. Finally, in a fourth embodiment, the measure of load on the spindle motor comprises a measure of the voltage applied to the coils of the spindle motor as the spindle motor rotates at its predetermined operating speed. It is understood that the load on a spindle motor may be measured in other ways, and the present invention is by no means limited to those described hereinafter.

According to the first embodiment of the cartridge detection method of the present invention, the presence of a disk cartridge in the disk drive is detected by obtaining a measure of the time the spindle motor 82 of the disk drive takes to reach a predetermined operating speed, and then comparing that time to a threshold value. This embodiment recognizes that, due to inertia, a spindle motor that is engaged with the hub of a disk cartridge will take longer to reach its full operating speed than it will in the absence of any such load.

Figure 8:
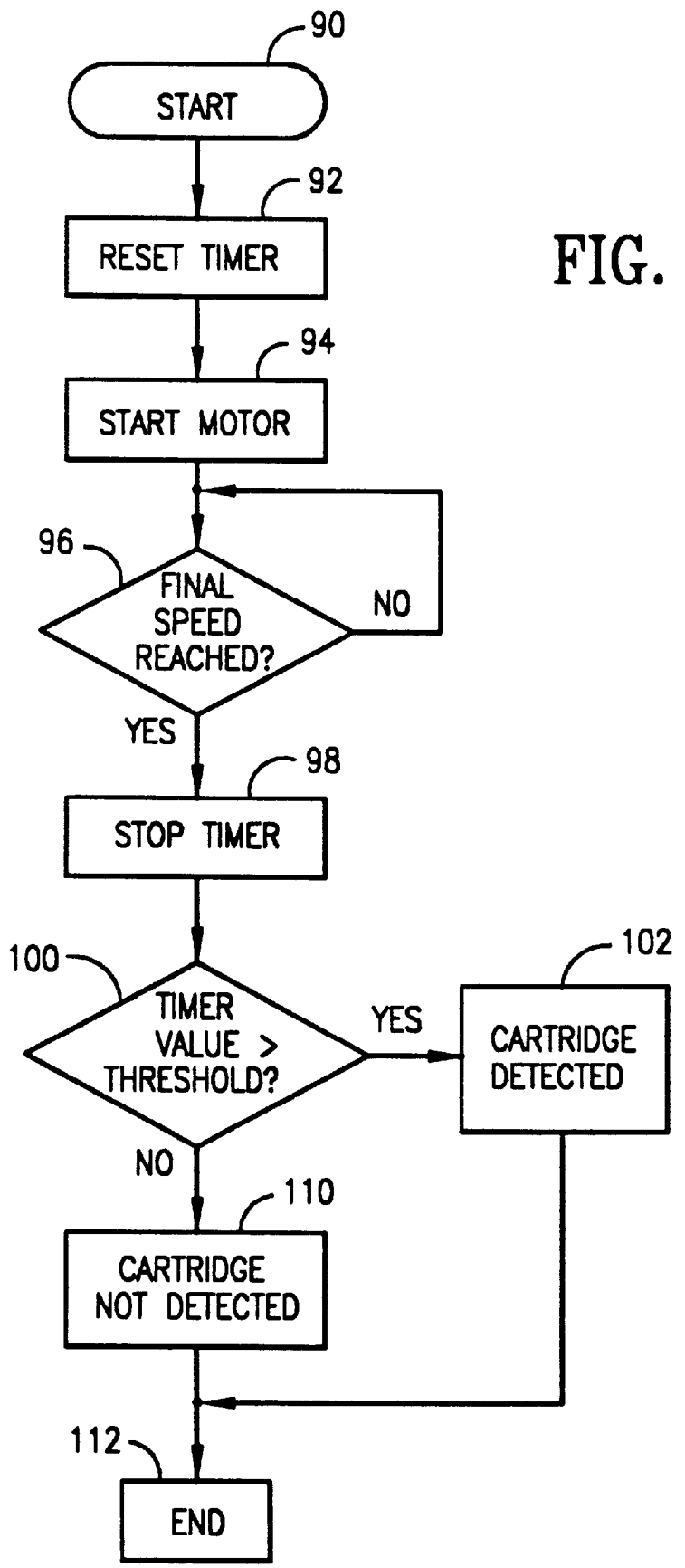
FIG. 8 is a flow diagram illustrating one embodiment of a cartridge detection method of the present invention.

FIG. 8 is a flow diagram illustrating the first embodiment of the method of the present invention in greater detail. The method may be implemented in a microprocessor (not shown) within the disk drive 40 and may employ other components of the internal circuitry of the disk drive. The method begins at step 90, where control passes directly to step 92. In a disk drive that employs a movable platform, such as the platform 50 of the disk drive illustrated in FIGS. 3–7, the steps of the method illustrated in FIG. 8 may be initiated upon detecting movement of the platform 50 into its rearward position (i.e., activation of the switch 84—FIG. 7). It is understood, however, that the method of the present invention may be employed in other types of disk drives that do not employ a movable platform. In such cases, other indications can be used to initiate the steps of the method.

At step 92 a timer, which may be implemented in the microprocessor, is reset to a value of zero. Upon being reset, the timer begins to run. Next, at step 94, rotation of the spindle motor is initiated. Preferably, steps 92 and 94 are performed substantially simultaneously. The spindle motor is instructed to spin-up to a predetermined operating speed, e.g., 3000 rpm.

Next, control passes to step 96 where the speed of rotation of the spindle motor is monitored. Step 96 is repeated at short intervals until it is determined that the spindle motor has reached its predetermined operating speed. When it is determined that the motor has reached its full operating speed, control passes to step 98 where the timer is stopped. At step 100, the value of the timer is compared to a predetermined threshold. If the value of the timer is greater than or equal to the predetermined threshold, then control passes to step 102 where an indication is made that the presence of a cartridge has been detected. At this point, the processor in the drive can, for example, activate the solenoid 74 of FIGS. 4–7 in order to disengage the head locking lever 72 from the carriage 62 of the linear actuator, allowing the heads 18, 19 disposed on the actuator to be loaded onto the disk 14 within the cartridge.

If, however, it is determined that the timer value is less than the threshold value, then at step 110, an indication is made that no cartridge was detected. Upon failure to detect the presence of a disk cartridge in the disk drive, the microprocessor can, for example, activate the solenoid 74 to disengage the eject latch lever 70 from the latch projection 78 causing the empty platform 50 to spring forward to its initial, forward position.

It has been found that with certain types of media, such as relatively light weight flexible media, the inertia of the media is too low to provide a sufficient distinction between the spin-up time of the spindle motor with and without a cartridge present. The method illustrated in FIG. 8 is therefore best suited for applications in which the rotating media has a greater mass, such as, for example, in removable hard disk cartridges. However, FIG. 8A illustrates a second embodiment of the method of the present invention that is better suited for use in low inertia applications.

Figure 8A:
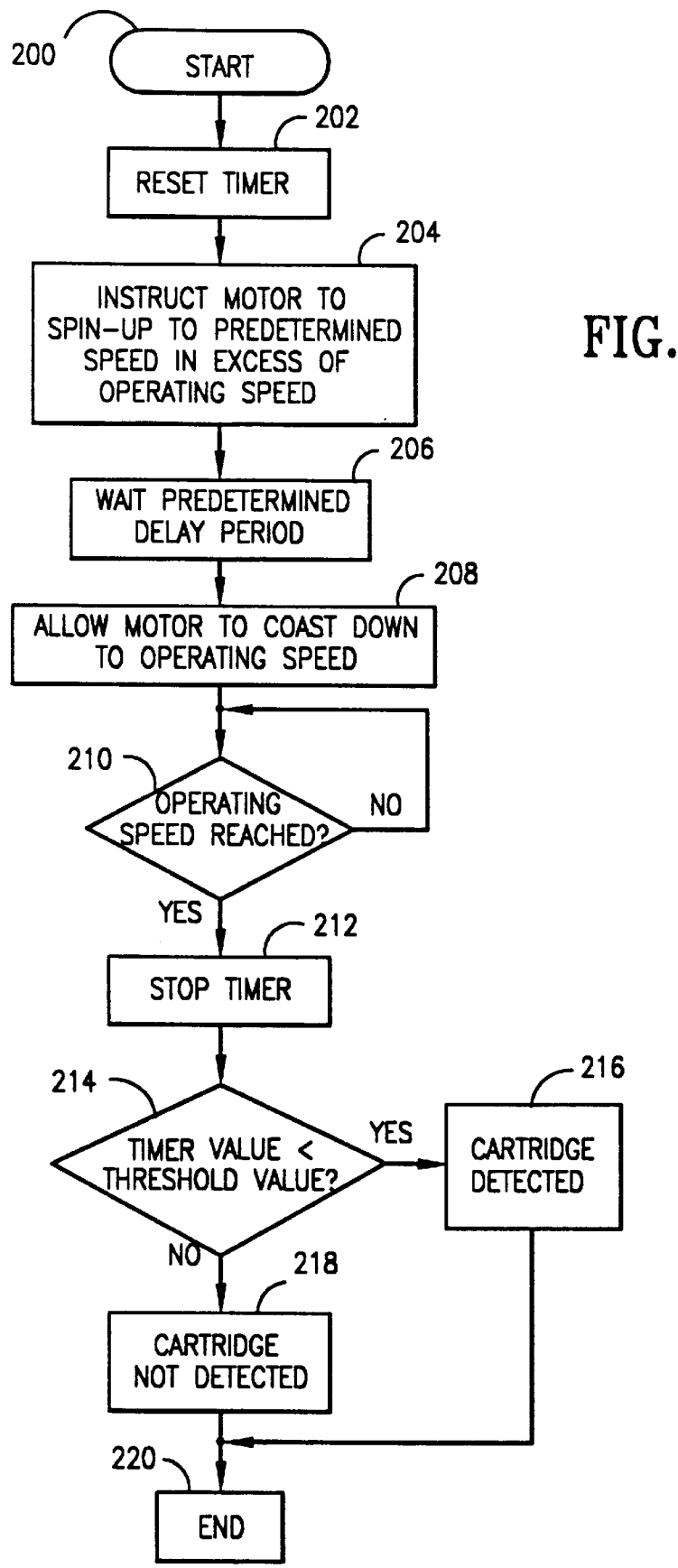
FIG. 8A is a flow diagram illustrating a second embodiment of the cartridge detection method of the present invention.

In the second embodiment illustrated in FIG. 8A, the presence or absence of a cartridge is determined by instructing the spindle motor 82 to spin-up to a first predetermined speed (e.g., 5000 rpm) in excess of its normal operating speed (e.g., 3000 rpm), and then measuring the amount of time it takes for the spindle motor to coast down to its operating speed. It has been found that even with flexible storage media, the spindle motor 82 will coast down to its normal operating speed rather quickly under the load of a disk cartridge. In the absence of a disk cartridge, however, the spindle motor can take up to ten (10) times as long to coast down to its normal operating position. In this embodiment, therefore, a shorter measured time indicates a greater load on the spindle motor.

Referring to FIG. 8A, the second embodiment of the method of the present invention begins at step 200, where control passes directly to step 202. In a disk drive that employs a movable platform, such as the platform 50 of the disk drive illustrated in FIGS. 3–7, the steps of the method illustrated in FIG. 8A may be initiated upon detecting movement of the platform 50 into its rearward position (i.e., activation of the switch 84—FIG. 7). It is understood, however, that this second embodiment of the method of the present invention can be employed in other types of disk drives that do not employ a movable platform. In such cases, other indications can be used to initiate the steps of the method.

At step 202 a timer, which may be implemented in a microprocessor, is reset to a value of zero. Upon being reset, the timer begins to run. Next, at step 204, the spindle motor is instructed to rotate up to a first predetermined speed (e.g., 5000 rpm) in excess of its normal operating speed. Preferably, steps 202 and 204 are performed substantially simultaneously.

Next, at step 206, the disk drive waits a predetermined delay period to allow the spindle motor to reach the first speed. At step 208, applied voltage across the motor windings is reduced and the motor begins to coast down to its predetermined operating speed (e.g., 3000 rpm).

Next, control passes to step 210 where the speed of rotation of the spindle motor is monitored. Step 210 is repeated at short intervals until it is determined that the spindle motor has reached its predetermined operating speed. When it is determined that the motor has reached its full operating speed, power to the spindle motor is restored to maintain the spindle motor at its operating speed, and control passes to step 212 where the timer is stopped. At step 214, the value of the timer is compared to a predetermined threshold.

As explained above, when a cartridge is present, the spindle motor will coast down to its predetermined operating speed much more quickly than it will in the absence of a cartridge. At step 214, therefore, if the value of the timer is less than or equal to the predetermined threshold, then control passes to step 216 where an indication is made that the presence of a cartridge has been detected. At this point, the processor in the drive can, for example, activate the solenoid 74 of FIGS. 4–7 in order to disengage the head locking lever 72 from the carriage 62 of the linear actuator, allowing the heads 18, 19 disposed on the actuator to be loaded onto the disk 14 within the cartridge.

If, however, it is determined at step 214 that the timer value exceeds the threshold value, then at step 218, an indication is made that no cartridge was detected. Upon failure to detect the presence of a disk cartridge in the disk drive, the microprocessor can, for example, activate the solenoid 74 to disengage the eject latch lever 70 from the latch projection 78 causing the empty platform 50 to spring forward to its initial, forward position.

Figure 9:
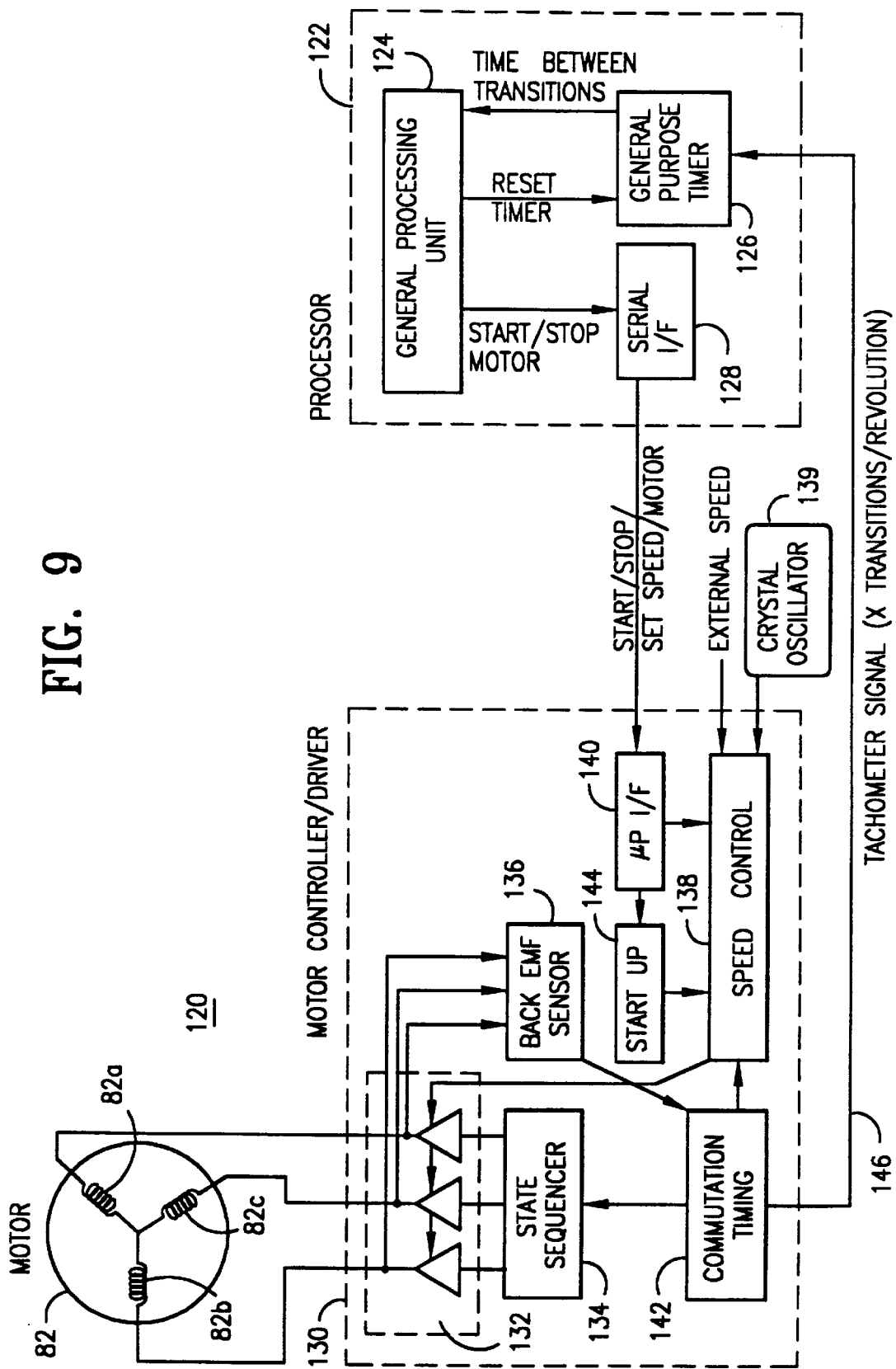
FIG. 9 is a block diagram illustrating apparatus for carrying out the methods of FIGS. 8 and 8A, as well as a preferred embodiment of a disk drive in accordance with the present invention.

FIG. 9 shows both apparatus for carrying out the methods of FIGS. 8 and 8A, and one embodiment of a disk drive in accordance with the present invention. As shown, the apparatus comprises a processor 122, which may be a microprocessor, microcontroller or any other type of processor. The processor 122 is coupled to a spindle motor controller/driver 130, which in turn, is coupled to the coils 82*a,b,c* or the spindle motor 82. In the preferred embodiment, the spindle motor 82 comprises a DC brushless motor.

The processor 122 comprises a general processing unit 124, a serial data interface 128 and a general purpose timer 126. The general processing unit 124 executes stored program code (not shown) in order to carry out the method of the present invention. The general processing unit 124 provides commands to the motor controller/driver 130 via the serial interface 128. These commands include: (i) initiate rotation of the motor and bring the motor to a predetermined speed, and (ii) stop the motor. The timer 126 can be started, read or reset at any time by the processor 122. The timer 126, which may include at least two separate timer circuits (not shown), is used to measure the time it takes the spindle motor 82 to either spin-up to (FIG. 8) or coast down to (FIG. 8A) its full operating speed, and to determine the speed of the spindle motor 82 at a particular time.

The spindle motor controller/driver 130 comprises a serial interface 140 coupled to the serial interface 128 of the processor 122, a start-up circuit 144, a speed control circuit 138, a commutation timing circuit 142, a state sequencer 134, a back EMF sensor 136 and a plurality of motor drivers 132. The serial interface 140 translates the instructions from the processor 122 into specific actions. Upon receiving a command to initiate rotation of the motor, the start-up circuit 144 will take control of the speed control circuit 138 until the motor has reached its full operating speed. Once the full operating speed is reached, the speed control circuit 138 begins normal operation.

The speed control circuit 138 compares the frequency between an external source, such as a crystal oscillator 139, to the frequency of the motor commutations. Frequency information is provided to the speed control circuit 138 by the commutation timing circuit 142. If the frequency of the spindle motor 82 is lower than the oscillator frequency, the motor is rotating too slowly. To remedy this, the speed control circuit 138 signals the drivers 132 to apply more voltage across the motor windings 82*a–c* to increase the speed of the motor 82.

The state sequencer 134 controls the individual drivers 132 to provide either a high voltage, a low voltage or a high impedance on the respective motor windings 82*a–c*. The state sequencer 134 sequences between six states in which different combinations of the high voltage/low voltage/high impedance are applied to the three coils 82*a–c* of the motor in order to cause the motor to rotate. Essentially, the drivers 132 amplify the respective outputs of the state sequencer 134. The magnitudes of the high and low voltages applied to the motor 82 by the drivers 132 are controlled by the speed control circuit 138. The higher the voltage applied across the coils (i.e., windings) of the motor, the greater the speed of the spindle motor 82.

The commutation timing circuit 142 controls when the state sequencer 134 changes states. Specifically, the commutation timing circuit 142 receives a signal from the back EMF sensor 136, waits a predetermined delay period, and then directs the state sequencer to change states. The back EMF sensor receives input from the drivers and the center-tap (not shown) of the spindle motor 82 in order to determine how far the motor has turned and in which direction.

The commutation timing circuit 142 also provides a tachometer signal, via line 146, to the general purpose timer 126 of the processor 122. The tachometer signal provides a predetermined number of signal pulses each time the spindle motor 82 rotates through a single revolution. The frequency of the tachometer signal indicate the speed of the spindle motor 82. Using the timer 126, the processor 132 can measure the frequency of the tachometer pulses, and thereby determine the speed of the motor 82.

Upon receiving a command from the processor 122 to initiate rotation of the spindle motor 82, the start-up circuit 144 directs the controller/driver 130 to move the motor an incremental amount. (e.g., 1/(3×# magnetic poles) revolution). Because the motor can rotate in either direction upon start-up, the back EMF sensor 136 is used to determined which direction the motor has begun to rotate. If the motor has begun to rotate the wrong direction, the commutation timing and sequence is adjusted to get the motor spinning in the proper direction. Once the motor is spinning in the proper direction, the motor controller/driver 130 continues to commutate the motor normally. During this time, the start-up circuit 144 directs the speed control circuit 138 to drive the drivers 132 at maximum voltage levels. Once the spindle motor 82 reaches its full operating speed, the start-up circuit 144 relinquishes control of the speed control circuit 138. The speed control circuit 138 then begins adjusting the outputs of the respective drivers 132 to maintain the motor 82 at its predetermined operating speed.

When the processor 122 implements the method of FIG. 8, the processor 122 issues a command to the motor controller/driver 130 to spin-up the motor 82 to its predetermined operating speed. In the embodiment illustrated in FIGS. 4–7, the processor 122 is programmed to issue the command upon detecting activation of the switch 84, i.e., upon detecting movement of the platform 50 into the rearward, latched position. After issuing the command, the processor 122 resets the timer 126 and begins monitoring the speed of the motor 82, as indicated by the frequency of the tachometer signal. When the processor 122 detects that the motor 82 has reached its full operating speed, the processor 122 stops the timer 126 and compares its value to a threshold value representing the time it should take the motor to reach full operating speed when a cartridge is properly inserted into the disk drive. If the timer value is less than the threshold value, then the processor 122 indicates that no cartridge was detected. The processor 122 can then, for example, issue a command to the motor controller/driver 132 to stop the motor. In the embodiment illustrated in FIGS. 4–7, the processor 122 may also issue a command to the solenoid 74 to move the eject lever 70 out of engagement with the latch projection 78 so that the platform 50 springs back to its forward position.

When the processor 122 implements the method of FIG. 8A, the processor 122 will issue a command to the motor controller/driver 130 to spin-up the motor 82 to a first speed in excess of its predetermined operating speed. As in the previous embodiment, the processor 122 is programmed to issue the command upon detecting activation of the switch 84, i.e., upon detecting movement of the platform 50 into the rearward, latched position. After issuing the command, the processor 122 resets the timer 126 and then waits a predetermined delay period. The delay period is designed to give the spindle motor an opportunity to approach the higher speed. The required delay period depends on the characteristics of the particular spindle motor. The delay period should be long enough to allow the spindle motor to approach the higher speed, however, it is not necessary for the motor to actually reach that higher speed.

After the delay period has expired, the motor controller/driver 130 is instructed by the processor 122 to allow the motor 82 to coast down to its normal operating speed. Thereafter, the processor 122 begins monitoring the speed of the motor 82 in the manner described above. When the processor 122 detects that the motor 82 has coasted down to its predetermined operating speed, the processor 122 stops the timer 126 and compares its value to a threshold value representing the time it should take the motor to coast down to its operating speed when a cartridge is properly inserted into the disk drive. If the timer value exceeds the threshold value, then the processor 122 indicates that no cartridge was detected. The processor 122 can then, for example, issue a command to the motor controller/driver 132 to stop the motor or may issue a command to the solenoid 74 to move the eject lever 70 out of engagement with the latch projection 78 so that the platform 50 springs back to its forward position.

Figure 10:
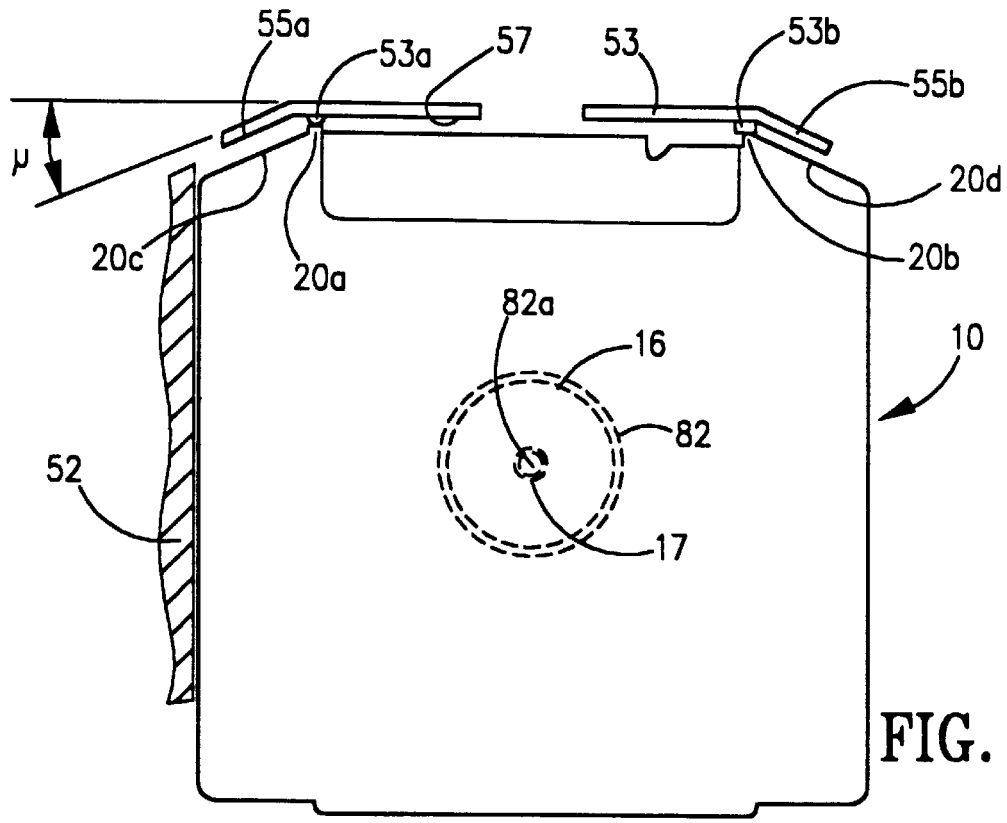
FIG. 10 is a top view of a portion of the disk drive of FIG. 3 illustrating further details of the cartridge receiving stop.

Referring to FIG. 10, in accordance with another aspect of the present invention, as mentioned briefly above, the cartridge receiving stop 53 has a substantially flat middle surface 57 disposed in fixed relation to the spindle motor 82 and a pair of angled outer edges 55a, 55b that extend outward from the substantially flat middle surface 57 of the stop 53 toward the insertion opening 51 of the disk drive at a pre-determined angle $\mu$. The substantially flat middle surface 57 of the cartridge receiving stop 53 has a pair of projections 53a, 53b positioned near the angled outer edges 55a, 55b.

Further in accordance with this aspect of the present invention, each of the front corners of the disk cartridge of the present invention has a non-square shape adapted to avoid interference with the angled outer edges 55a, 55b of the cartridge receiving stop 53 so that, upon insertion of the disk cartridge 10 into the disk drive, the front peripheral edge 20 of the disk cartridge 10 reaches the substantially flat middle surface 57 of the cartridge receiving stop 53, as shown in FIG. 10. In particular, the pair of projections 20a, 20b on the front peripheral edge 20 of the disk cartridge 10 engage the corresponding projections 53a, 53b on the middle surface 57 of the cartridge receiving stop 53. The substantially flat middle surface 57 of the cartridge receiving stop 53 is positioned relative to the spindle motor 82 such that when the projections 20a, 20b on the disk cartridge 10 engage the projections 53a, 53b on the stop 53, the hub 16 of the disk cartridge is aligned with the spindle motor 82. In this manner, a projection 82a on the spindle motor 82 engages a through hole 17 at the center of the disk hub 16.

Figure 11:
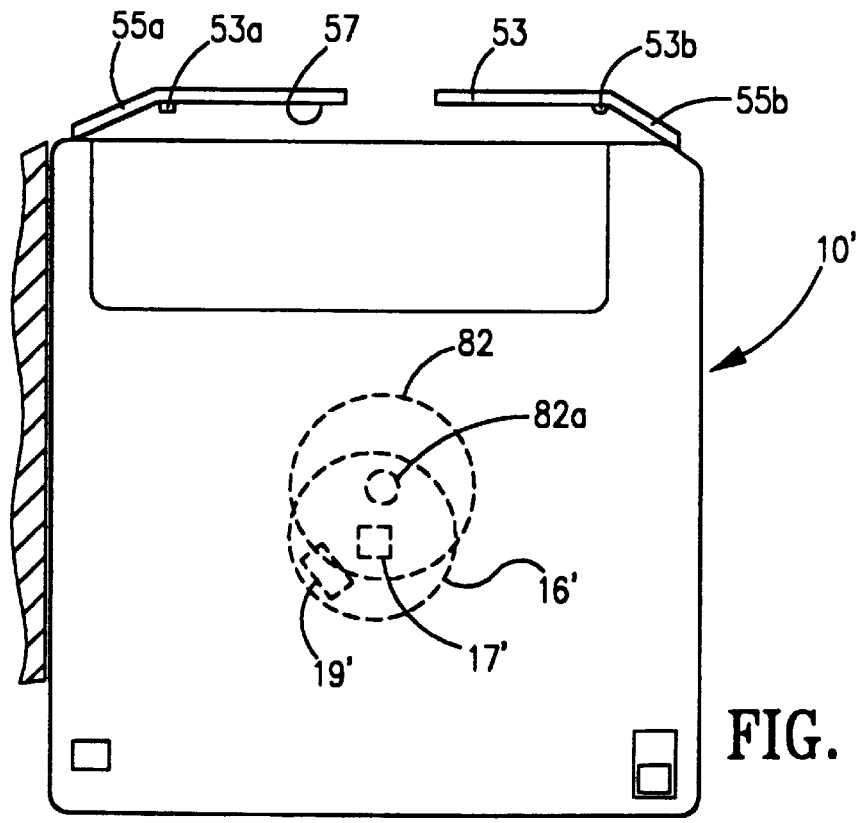
FIG. 11 illustrates the insertion of an incompatible disk cartridge into the disk drive of the present invention.

The angled outer edges 55a, 55b of the cartridge receiving stop 53 serve to impede the insertion of an incompatible cartridge into the disk drive 44 and to ensure that the hub of such an incompatible disk cartridge does not align with the spindle motor 82 of the disk drive 40. This feature is illustrated in FIG. 11. As shown, when an incompatible disk cartridge 10' having substantially square front corners, such as a conventional 3.5" floppy disk, is inserted into the disk drive 40, the angled outer edges 55a, 55b of the cartridge receiving stop 53 engage the front corners of the incompatible disk cartridge 10' and prevent the front peripheral edge of the incompatible disk cartridge 10' from reaching the substantially flat middle surface 57 of the stop 53. As a result, the incompatible disk cartridge 10' cannot be fully inserted into the disk drive, and the through hole 17' at the center of the hub 16' of the incompatible disk cartridge 10' cannot align with the projection 82a on the spindle motor 82. Thus, even though the platform 50 may be pushed back into its rearward position, the cartridge sensing method and apparatus of the present invention will not detect the presence of the cartridge 10' since the hub 16' of the incompatible cartridge 10' will not be engaged with the spindle motor 82. In the absence of any load, the spindle motor 82 will spin-up to its full operating speed in a time less than the aforementioned threshold, and therefore, no cartridge will be detected. The processor 122 can then signal the solenoid 74 to release the eject latch lever 70 and allow the platform 50 to spring back to its forward position, ejecting the incompatible disk cartridge 10' from the drive 40.

Some incompatible disk cartridges, e.g., the conventional 3.5" floppy disk cartridge illustrated in FIG. 11, have an additional opening 19' offset from the center opening 17'. It is possible that even though the central opening 17' in the hub 16' of the incompatible disk cartridge 10' will not engage the projection 82a on the spindle motor 82, the hub 16' may be positioned such that the projection 82a does enter the offset opening 19'. In such a case, the cartridge presence sensing method and apparatus of the present invention might detect the presence of a cartridge. Additional aspects of the present invention, described hereinafter, provide additional protection in the event that this occurs.

Figure 12A:
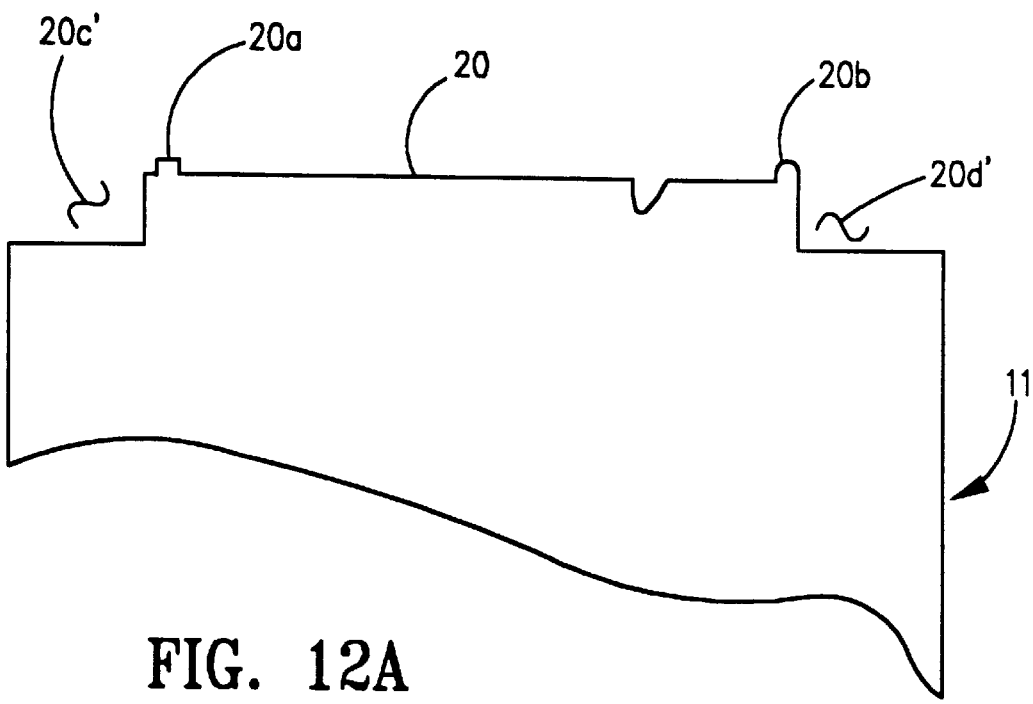
FIGS. 12(a) and 12(b) show alternative embodiments of the forward end of the disk cartridge of the present invention.
Figure 12B:
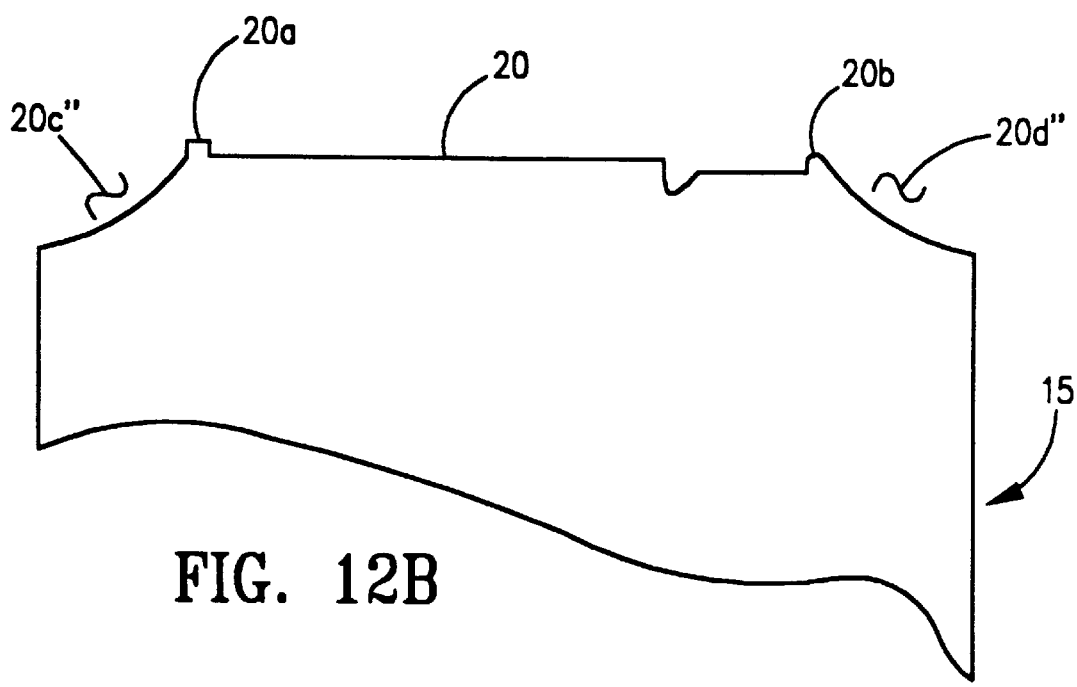

As mentioned above, in the preferred embodiment, the opposite front corners 20c, 20d of the disk cartridge 10 of the present invention form angled surfaces that angle away from the front peripheral edge 20 of the disk cartridge 10 toward the rear end 12b at a predetermined angle, θ. Preferably, the angle μ of the outer angled edges 55a, 55b of the cartridge receiving stop is substantially the same as the angle θ of the non-square corners 20c, 20d of the disk cartridge 10. However, in other embodiments, the non-square shape of the front corners 20c, 20d of the disk cartridge 10 may be different, so long as the non-square shape is adapted to avoid interference with the outer edges 55a, 55b of the cartridge receiving stop 53. For example, FIG. 12(a) illustrates an alternative embodiment of a disk cartridge 11 in accordance with the present invention, wherein the non-square shape of each front corner 20c', 20d' resembles a right-angle notch. FIG. 12(b) illustrates yet another embodiment of a disk cartridge 15 in accordance with the present invention wherein the non-square corners 20c'', 20d'' are arc-shaped and concave. In each of these embodiments, the non-square shape of the corners 20c, 20d will avoid interference with the outer edges 55a, 55b of the cartridge receiving stop 53.

According to a further aspect of the present invention, the disk drive 40 further comprises a means for enabling a function of the disk drive, such as unlocking of the head actuator 60 or movement of the platform 50, upon insertion of the disk cartridge 10 into the disk drive. The enabling means includes an operating member disposed on the substantially flat middle surface 57 of the cartridge receiving stop. A projection (e.g., projection 20a) on the front peripheral edge of the cartridge 10 is adapted to engage the operating member in order to operate the enabling means. Because of the angled outer edges 55a, 55b of the cartridge receiving stop 53, an incompatible cartridge having substantially square front corners cannot reach the operating member and therefore cannot operate the enabling means.

Figure 13:
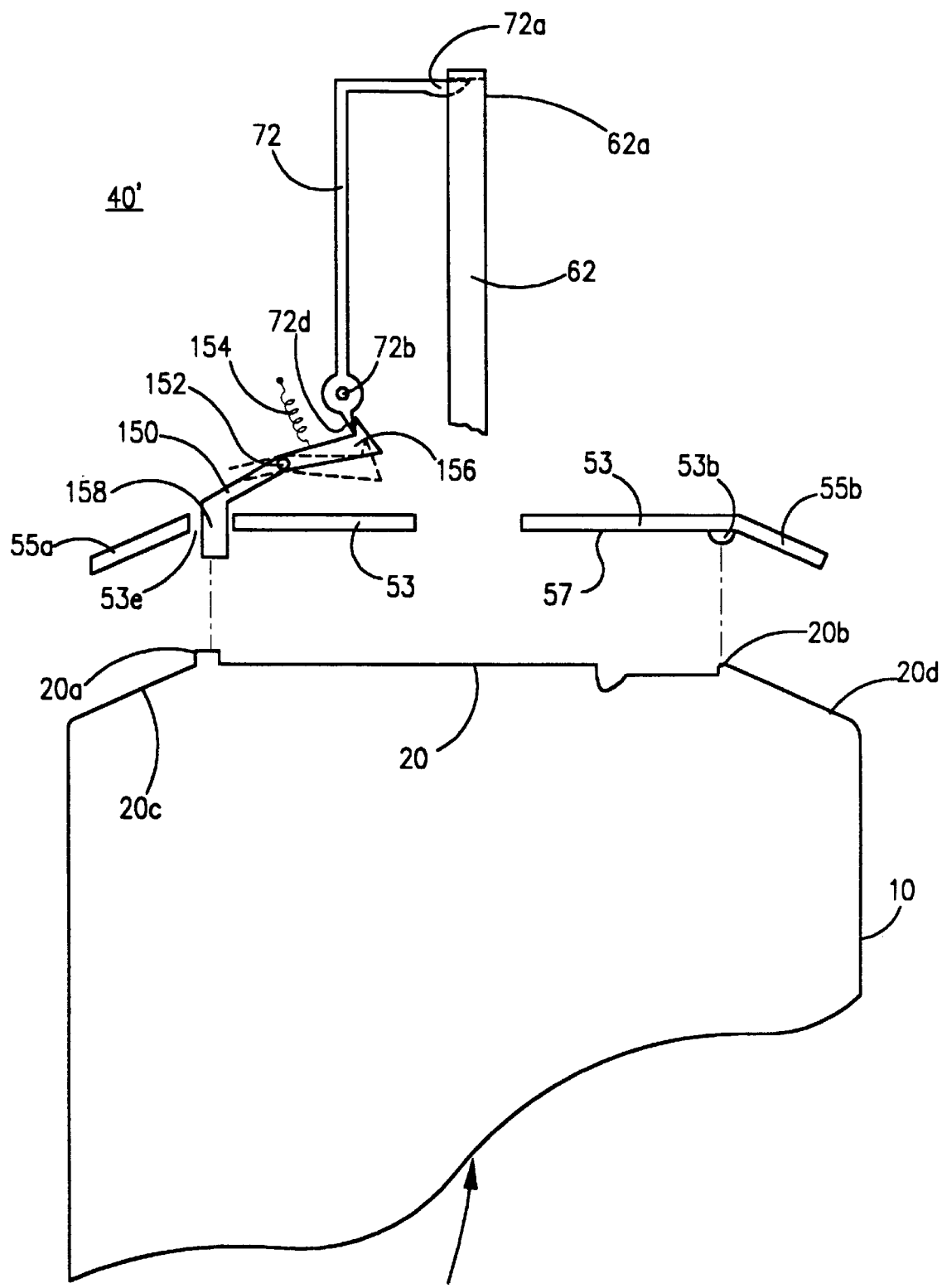
FIG. 13 shows one embodiment of a disk drive in accordance with an additional aspect of the present invention.

FIG. 13 is a top view of a portion of a disk drive 40' in accordance with one embodiment of this additional aspect of the present invention. In the embodiment of FIG. 13, the enabling means comprises an enabling lever 152 rotatably mounted on the platform 50 about a rotation shaft 152. The enabling lever 150 has a first end 156 and a second end 158. The first end 156 has a claw-like projection formed thereon that abuts a similar projection 72d formed on the pivoting end of the head locking lever 72 described above. A spring 154 is attached to the first end 156 of the enabling lever 150 in order to bias the claw-like projection on the first end 156 of the enabling lever 150 into abutment with the projection 72d on the head locking lever. Thus, in the position shown in FIG. 13, the enabling lever will prevent movement (i.e., disable) the head locking lever 72a. As a result, the carriage 62 of the actuator 60 cannot be unlocked.

The second end 158 of the enabling lever 150 extends through an opening 53a in the cartridge receiving slot 53 and defines an operating member of the lever 150. A disk cartridge 10 in accordance with this aspect of the present invention has a projection (e.g., projection 20a) formed on the front peripheral edge 20 of the disk cartridge and adapted to engage the operating member 158 of the enabling lever 150 when the front peripheral edge 20 of the cartridge 10 reaches the substantially flat middle surface of the cartridge receiving stop 53. As the front peripheral edge 20 of the disk cartridge 10 reaches the substantially flat middle surface 57 of the stop 53, the projection 20a on the disk cartridge 10 pushes against the operating member 158 of the enabling lever 150 causing the lever 150 to rotate clock-wise against the force of the spring 154 to a second position (dashed lines). In this second position, the first end 156 of the enabling lever 150 no longer abuts the projection 72d on the head locking lever. The head locking lever 72 is therefore free to move and unlocking of the actuator 60 has been enabled. As can be appreciated, an incompatible disk cartridge having at least one substantially square front corner will not be able to reach the operating member 158 and therefore cannot enable unlocking of the actuator 60.

Figure 14:
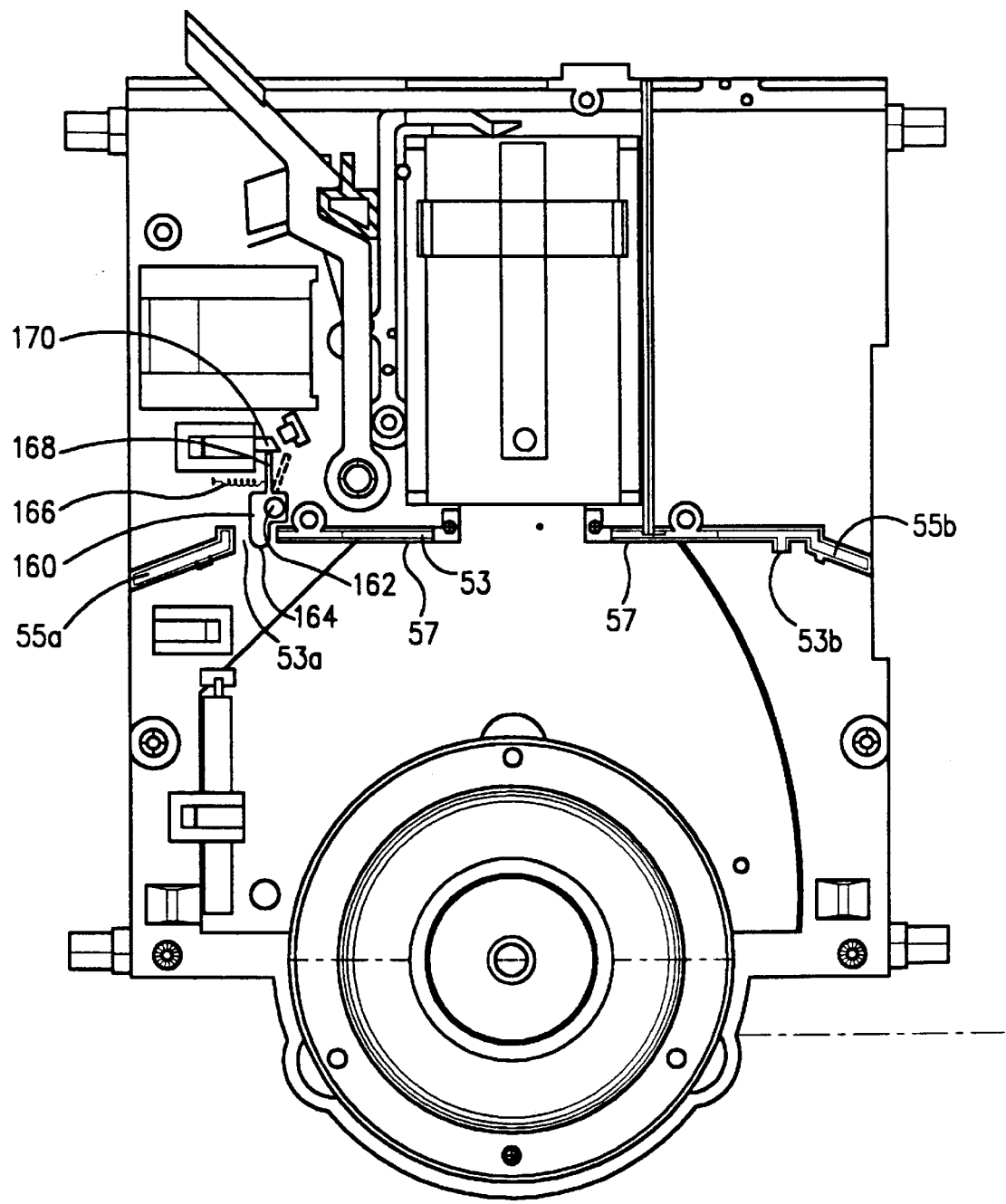
FIGS. 14 and 14(a) show an alternate embodiment of the disk drive of FIG. 13.
Figure 14A:
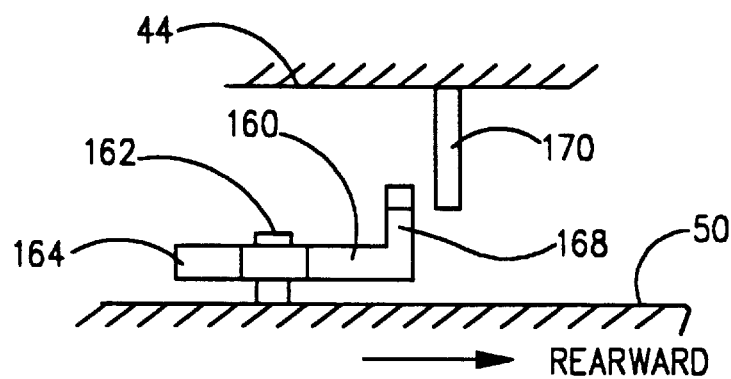

FIGS. 14 and 14(a) illustrate another embodiment of a disk drive 40'' in accordance with this further aspect of the present invention. In this embodiment, the enabling means enables movement of the platform 50. As shown, the enabling means comprises a projection 170 rigidly mounted on an inside cover of the disk drive housing 42. For example, the rigid projection 170 may be formed as part of the upper cover 44 (FIG. 14(a)) of the disk drive housing 42. The enabling means further comprises an enabling lever 160 rotatably mounted on the platform 50 about a rotation shaft 162. The enabling lever 160 has a first end 166 and a second end 164. A spring 166 biases the enabling lever 160 into a first position, i.e., the position shown in FIG. 14. In this first position, an L-shaped projection on the first end 168 of the enabling lever 160 will collide with the rigid projection 170 if an attempt is made to move the platform rearwardly. Thus, when the enabling lever 160 is in its first position, movement of the platform 50 is disabled.

The second end 164 of the enabling lever 160 extends through an opening 53a in the cartridge receiving slot 53 and defines an operating member of the lever 160. As the front peripheral edge 20 of a disk cartridge 10 reaches the substantially flat middle surface 57 of the stop 53, the projection 20a on the disk cartridge 10 pushes against the operating member 164 of the enabling lever 160 causing the lever 160 to rotate clock-wise against the force of the spring 166 to a second position (dashed lines). In this second position, the L-shaped projection on the first end 168 of the enabling lever 160 will no longer collide with the rigid projection 170. Movement of the platform 50 is therefore enabled. As in the previous embodiment, however, an incompatible disk cartridge having at least one substantially square front corner will not be able to reach the operating member 164 and therefore cannot enable movement of the platform 60.

Figure 15:
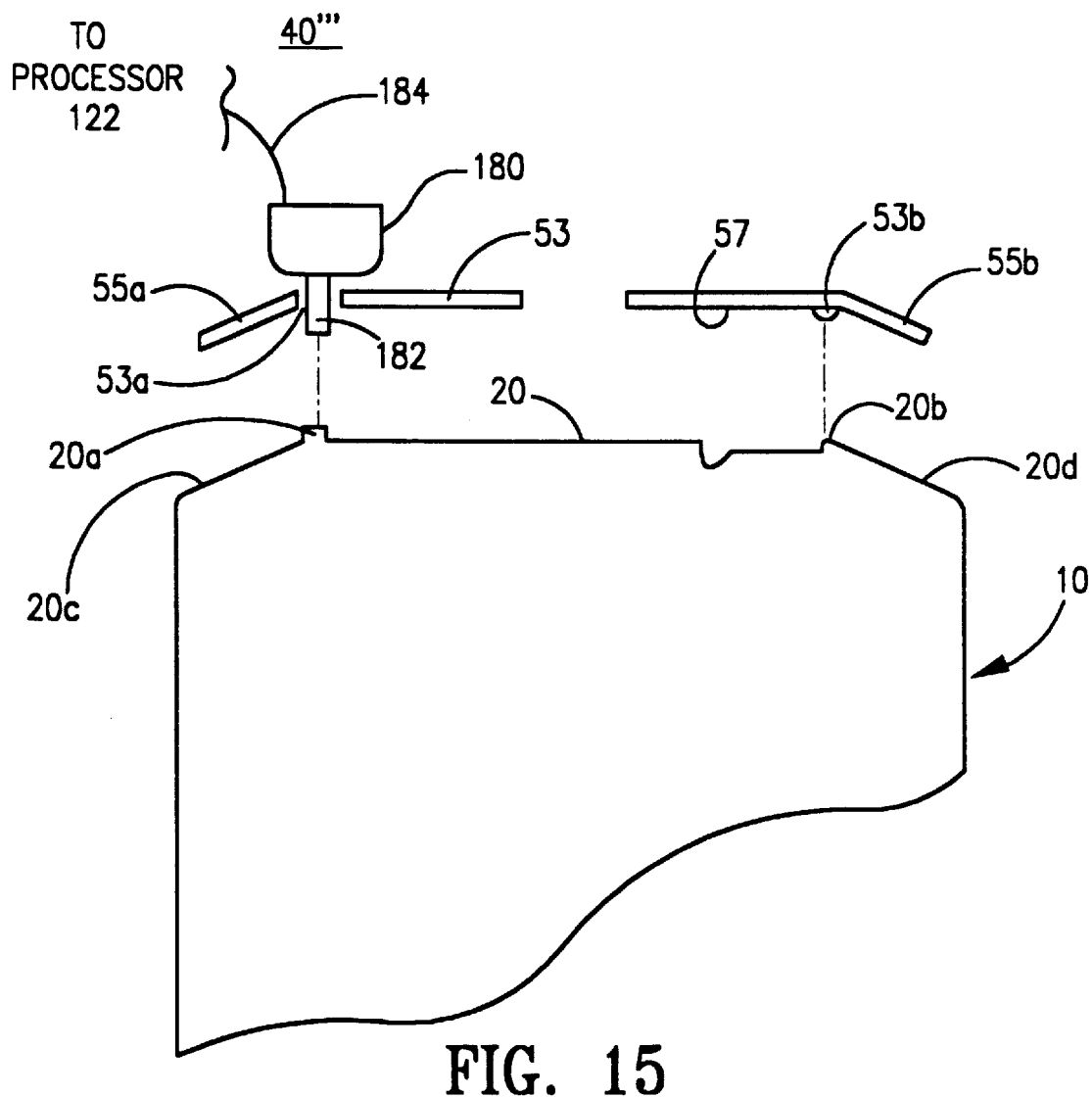
FIG. 15 shows yet another embodiment of the disk drive of FIG. 13.

FIG. 15 illustrates yet another embodiment of a disk drive 40''' in accordance with this additional aspect of the present invention. In the embodiment of FIG. 15, the enabling means comprises a switch 180 electrically connected via line 184 to the processor 122 described above. The switch 180 has a plunger 182 that extends through an opening 53a in the cartridge receiving stop 53. The plunger defines the operating member of the enabling means. When a disk cartridge 10 of the present invention is inserted into the disk drive 40, the projection 20a on the front peripheral edge of the cartridge 10 will depress the plunger 182 activating the switch 180. Activation of the switch 180 is detected via line 184 by the processor 122.

According to this embodiment, the processor is programmed to enable certain functions of the disk drive, such as rotation of the spindle motor or unlocking of the actuator 160, only after it detects activation of the switch 180. For example, unless activation of the switch 180 is detected, the processor 122 will not issue a command to the motor controller/driver 130 (FIG. 9) to initiate rotation of the spindle motor, even if the platform 50 has moved into its latched, rearward position. Alternatively, or in addition, the processor 122 can be programmed not to energize the solenoid 74 unless activation of the switch 180 has been detected. In this manner, unlocking of the actuator 60 is disabled until the switch is activated. As in the previous embodiments, an incompatible cartridge that does not have a shape that conforms to the shape of the cartridge receiving stop cannot reach the plunger 182 and will not activate the switch 180. Thus, an incompatible cartridge cannot enable these functions.

Figure 16:
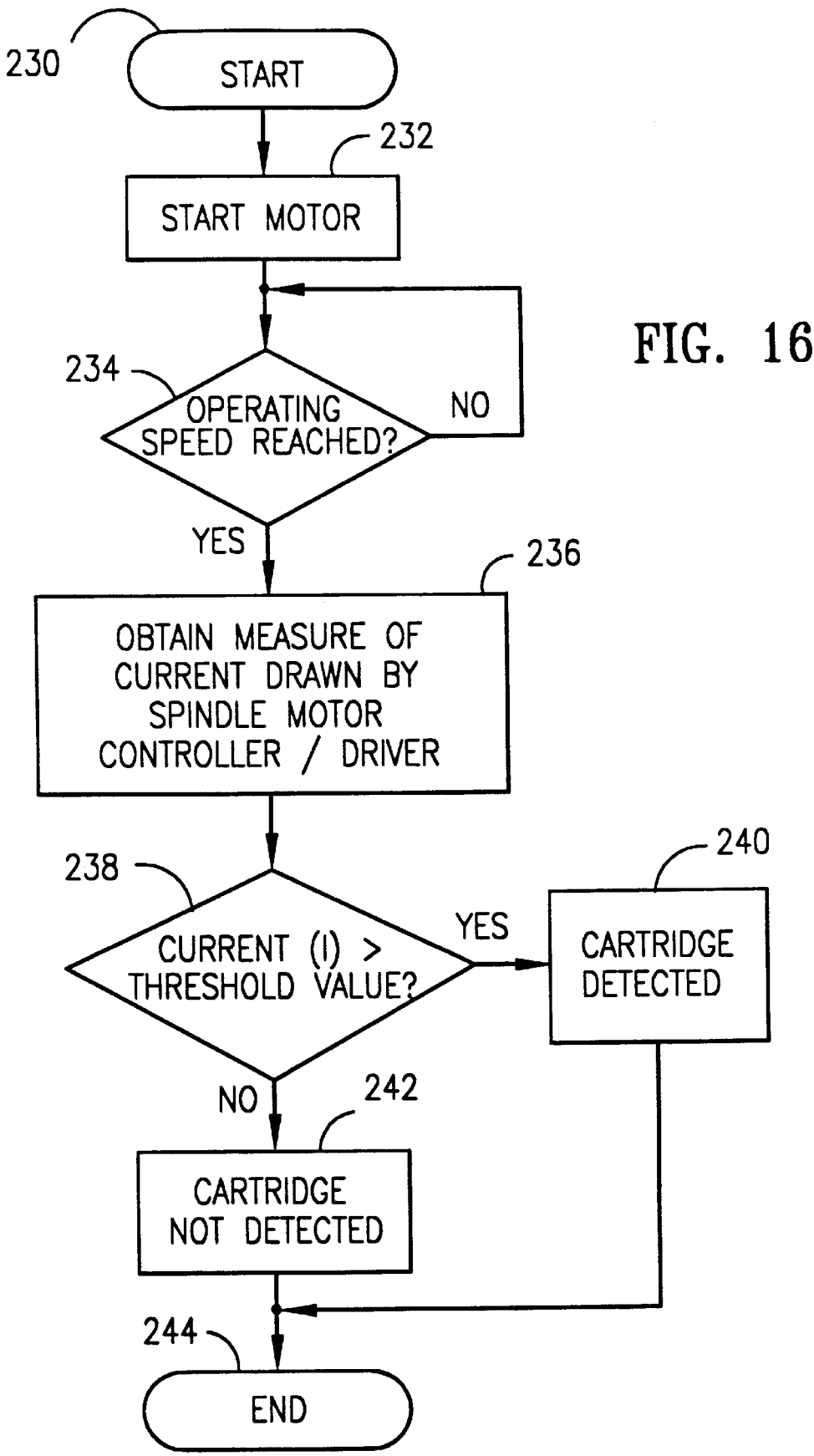
FIG. 16 is a flow diagram illustrating a third embodiment of the cartridge detection method of the present invention.

FIG. 16 is a flow diagram illustrating a third embodiment of the cartridge detection method of the present invention. In this third embodiment, the measure of load on the spindle motor comprises a measure of the current drawn by the spindle motor controller/driver 130 as it maintains the spindle motor at its predetermined operating speed. As with the other embodiments, this embodiment may be carried out at least partially in a microprocessor (not shown) within the disk drive 40 and may employ other components of the internal circuitry of the disk drive.

As shown in FIG. 16, the method begins at step 230, where control passes directly to step 232. In a disk drive that employs a movable platform, such as the platform 50 of the disk drive illustrated in FIGS. 3–7, the steps of the method illustrated in FIG. 16 may be initiated upon detecting movement of the platform 50 into its rearward position (i.e., activation of the switch 84—FIG. 7). It is understood, however, that this embodiment of the method of the present invention may be employed in other types of disk drives that do not employ a movable platform. In such cases, other indications can be used to initiate the steps of the method.

At step 232, the spindle motor controller/driver 130 is instructed to initiate rotation of the spindle motor 82 and to bring the spindle motor 82 up to its predetermined operating speed (e.g., 3000 rpm). Next, control passes to step 234 where the speed of rotation of the spindle motor is monitored. Step 234 is repeated at short intervals until it is determined that the spindle motor 82 has reached its predetermined operating speed. When it is determined that the motor has reached its full operating speed, control passes to step 236.

At step 236, a measure of the current drawn by the spindle motor controller/driver 130 from a supply voltage is obtained. Due to the increased load on the spindle motor when a cartridge is present, the spindle motor controller/driver 130 will draw a greater current from the supply voltage in order to maintain the spindle motor at its predetermined operating speed. At step 238, the measured current (I) is compared to a threshold value that represents the maximum expected current draw in the absence of a cartridge. Thus, if the measured current exceeds the threshold value, then it is assumed that a cartridge is present, and control passes to step 240 where an indication is made that a cartridge has been detected. At this point, the processor in the drive can, for example, activate the solenoid 74 of FIGS. 4–7 in order to disengage the head locking lever 72 from the carriage 62 of the linear actuator, allowing the heads 18, 19 disposed on the actuator to be loaded onto the disk 14 within the cartridge.

If, however, it is determined in step 238 that the measured current is less than the threshold value, then at step 242, an indication is made that no cartridge was detected. Upon failure to detect the presence of a disk cartridge in the disk drive, the microprocessor can, for example, activate the solenoid 74 to disengage the eject latch lever 70 from the latch projection 78 causing the empty platform 50 to spring forward to its initial, forward position.

Figure 17:
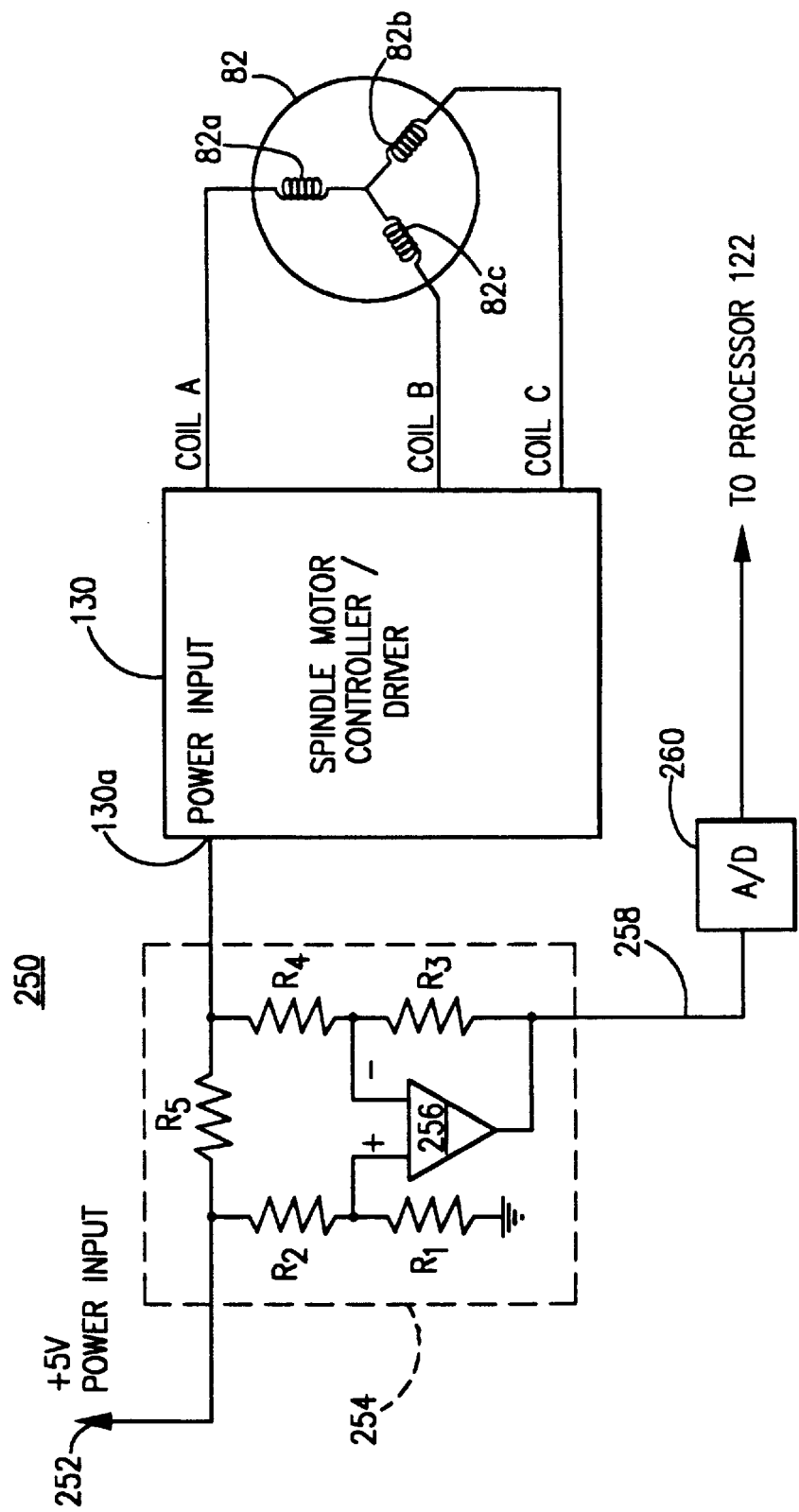
FIG. 17 is a partial block diagram of a disk drive incorporating apparatus for carrying out the method of FIG. 16.

FIG. 17 is a partial block diagram of a disk drive incorporating apparatus for carrying out the method of FIG. 16 in a disk drive. As shown, the disk drive includes a current sensor 254 coupled between the spindle motor controller/driver 130 and a supply voltage 252 that powers the spindle motor controller/driver 130. The current sensor 254 is adapted to sense the current drawn by the spindle motor controller/driver as it maintains the spindle motor at its predetermined operating speed. In the present embodiment, the current sensor 254 provides, on line 258, a voltage proportional to the magnitude of the current drawn by the spindle motor controller/driver 130.

In the present embodiment, the current sensor 254 comprises a small resistance $R_5$, (e.g., 0.5 Ω) coupled in series between the power supply voltage 252 and a power input 130a of the spindle motor controller/driver, and an amplifier coupled across the resistor $R_5$. The amplifier comprises resistors $R_1, R_2, R_3$ and $R_4$ and an operational amplifier 256. In the present embodiment, $R_1$=40 k Ω, $R_2$=1 k Ω, $R_3$=40 k Ω, $R_4$=1 k Ω and the operational amplifier comprises an MC3407 operational amplifier.

The amplifier serves to amplify any voltage drop across the resistor. The magnitude of the amplified voltage will be proportional to the magnitude of the current drawn by the spindle motor controller/driver 130. An analog-to-digital converter 260 is employed to convert the amplified voltage to a digital value which is then fed to an input (not shown) of the processor 122 (FIG. 9). The processor 122 is programmed to compare the digital value to the aforementioned threshold value, and to indicate whether a cartridge is present based on the result of that comparison. The analog-to-digital converter 260 may be implemented as part of the processor 122 or may be a separate component. It is understood that other apparatus for sensing the current drawn by the spindle motor controller/driver 130 may be employed without deviating from the spirit and scope of the present invention as defined by the appended claims.

Figure 18:
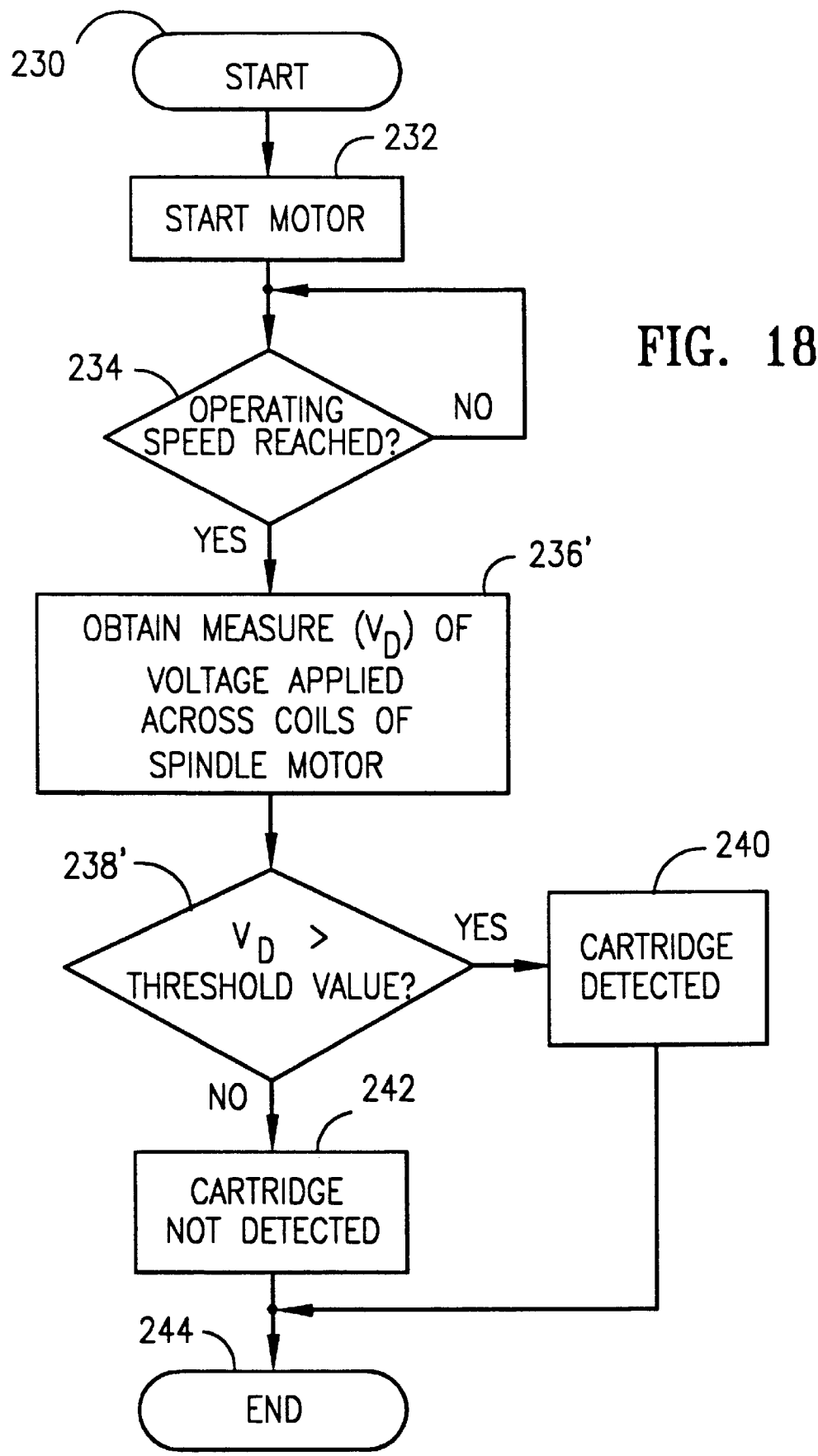
FIG. 18 is a flow diagram illustrating a fourth embodiment of the cartridge detection method of the present invention.

FIG. 18 is a partial flow diagram illustrating a fourth embodiment of the cartridge detection method of the present invention. In the fourth embodiment, the measure of load on the spindle motor 82 comprises a measure of the voltage applied across the coils 82a, 82b, 82c of the spindle motor 82 in order to maintain the spindle motor 82 at its predetermined operating speed. The method of this fourth embodiment differs from the method of the third embodiment (FIG. 16) only in steps 236' and 238'. As with the other embodiments, this embodiment may be carried out at least partially in a microprocessor (not shown) within the disk drive 40 and may employ other components of the internal circuitry of the disk drive.

The fourth embodiment recognizes that, due to the increased load on a spindle motor when a cartridge is present, a greater voltage must be sequenced across the coils of the spindle motor 82 to maintain the spindle motor at its predetermined operating speed. The voltage applied across the coils of the spindle motor 82 by the spindle motor controller/driver 130 therefore provides a measure of the load on the spindle motor. According to the fourth embodiment, as illustrated in FIG. 18, when the spindle motor 82 reaches its predetermined operating speed (step 234), control passes to step 236' where a measure of the voltage ($V_D$) applied across the coils of the spindle motor is obtained. Next, at step 238', the measured voltage ($V_D$) is compared to a threshold value that represents the maximum expected applied voltage in the absence of a cartridge. Thus, if the measured voltage exceeds the threshold value, then it is assumed that a cartridge is present, and control passes to step 240 where an indication is made that a cartridge has been detected. At this point, the processor in the drive can, for example, activate the solenoid 74 of FIGS. 4–7 in order to disengage the head locking lever 72 from the carriage 62 of the linear actuator, allowing the heads 18, 19 disposed on the actuator to be loaded onto the disk 14 within the cartridge.

If, however, it is determined in step 238' that the measured voltage is less than the threshold value, then at step 242, an indication is made that no cartridge was detected. Upon failure to detect the presence of a disk cartridge in the disk drive, the microprocessor can, for example, activate the solenoid 74 to disengage the eject latch lever 70 from the latch projection 78 causing the empty platform 50 to spring forward to its initial, forward position.

FIGS. 19(*a*) and 19(*b*) are plots illustrating the application of voltage by the spindle motor controller/driver 130 to one of the coils (e.g., 82*c*) of the spindle motor 82 over a period of time. FIG. 19(*a*) illustrates the application of voltage to the coil in the absence of a disk cartridge, whereas FIG. 19(*b*) illustrates the application of voltage to the coil when a disk cartridge is engaged with the spindle motor.

As mentioned briefly above, in the present embodiment, the spindle motor 82 comprises a DC brushless motor having three coils—82*a*, 82*b*, 82*c*. To achieve rotation of the spindle motor, the state sequencer 134 sequences a voltage ($V_D$) across different pairs of the coils 82*a*, 82*b*, 82*c*, over time, thereby causing the spindle motor 82 to rotate. For example, during one state (i.e., time period), the spindle motor controller/driver 130 will apply a voltage across coils 82*a* and 82*b*, while the third coil 82*c* is placed in a high impedance condition. At the next state (i.e., time period), the voltage might be applied across coils 82*a* and 82*c* while coil 82*b* is placed in a high impedance condition. Sequencing the applied voltage across different pairs of coils causes the spindle motor to rotate. The magnitude of the voltage applied across the coils affects the speed of rotation, and a greater voltage will be required to achieve a given speed of rotation when a cartridge is present due to the load the rotating media of the cartridge imposes on the spindle motor 82.

In the present embodiment, a voltage drop across a given pair of coils is achieved by applying a fixed, high voltage (e.g., +5 volts) to one of the coils, while applying a lower, variable voltage to the other coil. The magnitude of the voltage applied across the two coils is controlled by varying the magnitude of the lower, variable voltage. Lowering the variable voltage increases the magnitude of the voltage across the two coils. For example, with a fixed voltage of +5 V applied to one of the coils, a voltage of 2 V across the pair of coils is achieved by applying a voltage of 3 V to the other coil. A larger voltage drop across the coils, e.g. 4 V, can be achieved by applying an even lower voltage to the second coil, e.g., 1 V.

FIG. 19(*a*) illustrates the sequence of voltages applied to a given one of the coils of the spindle motor, e.g., coil 82*c*, over the six different states of the state sequencer 134. Sequencer states 1 and 2 represent the high voltage states wherein a fixed voltage (e.g., +5 V) is applied to coil 82*c*. During each of these states, one of the other two coils, e.g., 82*a*, 82*b*, will receive the lower, variable voltage. Sequencer states 4 and 5 represent the low, variable voltage states wherein the lower, variable voltage is applied to coil 82*c*. During each of these states, one of the other two coils will receive the higher, fixed voltage (e.g., +5 V). The difference between the higher, fixed voltage and the lower, variable voltage defines the voltage, $V_D$, applied across a respective pair of coils during a particular sequencer state.

FIG. 19(*a*) illustrate the sequence of voltages across coil 82(*c*) when no cartridge is present, and therefore, the load on the spindle motor 82 is minimal. In the example shown, the lower, variable voltage necessary to keep the motor spinning at its predetermined operating speed is approximately 3.5 V, which produces an applied voltage, $V_D$, across the respective pairs of coils of about 1.5 V. FIG. 19(*b*) shows an exemplary sequence of voltages needed to maintain the same spindle motor speed when a cartridge is engaged with the spindle motor. Under the increased load of the disk cartridge, the voltage, $V_D$, sequenced across each pair of coils must be increased, and therefore, the lower, variable voltage is reduced to approximately 1 V. This results in an applied voltage, $V_D$, across a given pair of coils of about 4 V. As the foregoing illustrates, by obtaining a measure of the voltage, $V_D$, sequenced across the respective pairs of coils of the spindle motor 82, and then comparing that measure of voltage to a threshold value, the presence or absence of a disk cartridge can be determined.

Figure 19A:
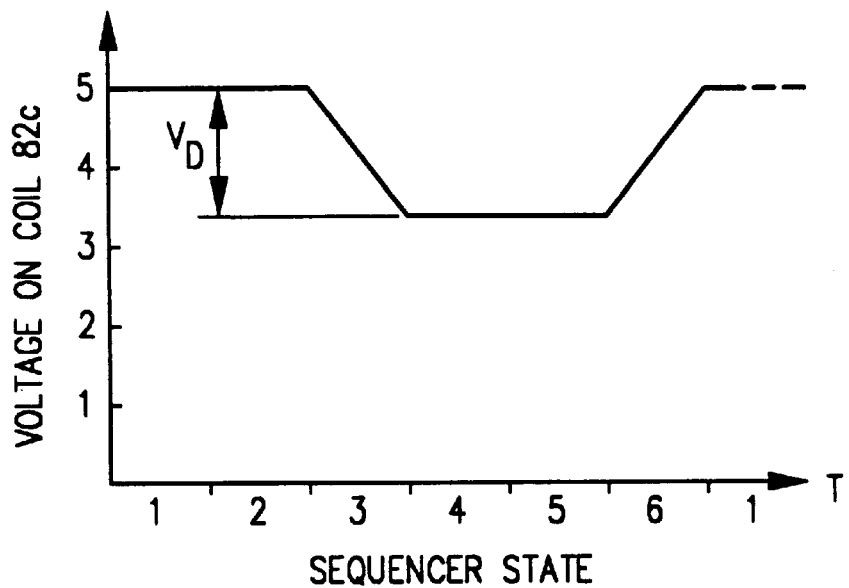
FIGS. 19(a) and 19(b) are plots illustrating the application of a voltage to one of the coils of a spindle motor in the absence, and presence, of a disk cartridge, respectively.
Figure 19B:
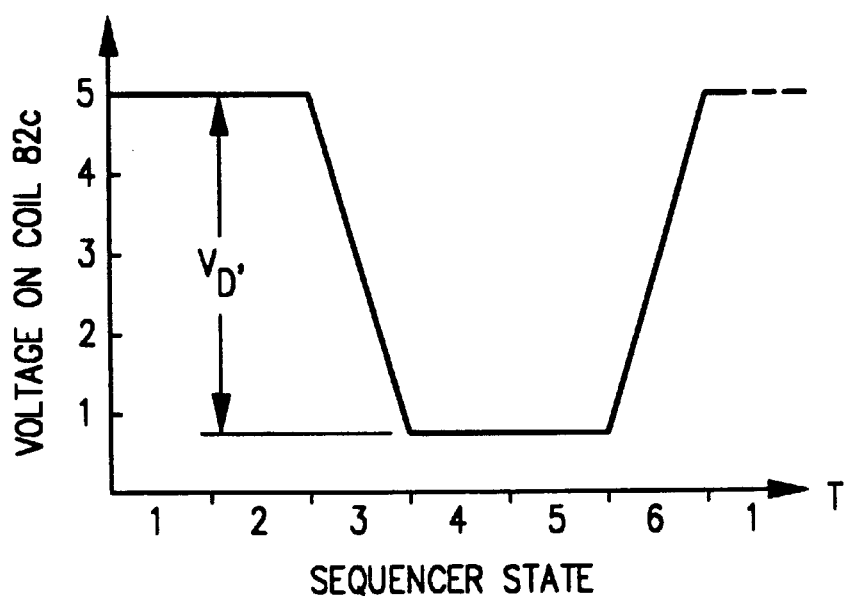
Figure 20:
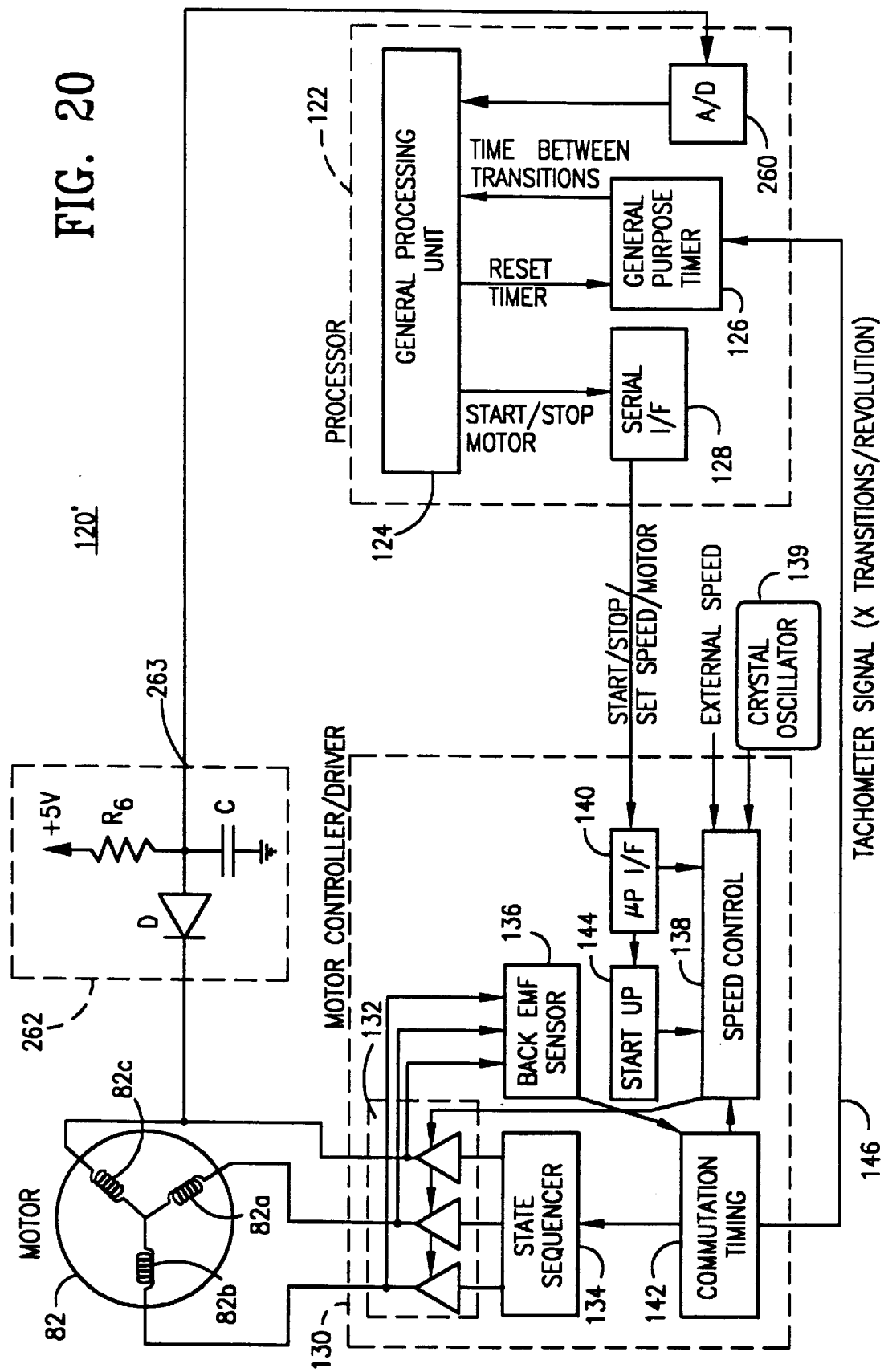
FIG. 20 is a block diagram of a disk drive incorporating apparatus for carrying out the method of FIG. 18.

FIG. 20 is a block diagram of a disk drive 120' incorporating apparatus for carrying out the method of FIG. 18. As shown, the disk drive 120' includes a voltage sensor 262 coupled to an output of one of the drivers 132 of the spindle motor controller/driver 130 for sensing the voltage applied to one of the coils, e.g., coil 82*c*, of the spindle motor 82. In the present embodiment, the voltage sensor 262 comprises a resistor $R_6$, a capacitor C, and a diode D. In this embodiment, the voltage sensor 262 does not provide an output equal to the magnitude of the voltage drop across a given pair of coils. Rather, the output 263 of the voltage sensor 262, by operation of the resistor $R_6$, capacitor C and diode D, provides a continuous voltage substantially equal to the lower, variable voltage applied to coil C in sequencer states 4 and 5 of FIGS. 19(*a*) and (*b*). The output of the voltage sensor 262 is converted to a digital value by an analog-to-digital converter 260, which can be implemented as part of the processor 122, or can be a separate component. The digital value is fed to the general processing unit 124 for processing in accordance with the present invention. Because the high voltage applied to the various coils is fixed at +5 V, the voltage, $V_D$, applied across the coils can be determined by subtracting the value of the lower, variable voltage (measured by the voltage sensor) from the fixed 5 V value. Thus, the processor 122 can determine and compare the applied voltage, $V_D$, to a threshold value in order to determine whether the spindle motor is carrying the load of a disk cartridge.

The diode D of the voltage sensor allows the analog-to-digital converter to follow the lower, variable voltage applied to coil 82*c* without affecting the current going to the motor. The capacitor C and resistor $R_6$ smooth the output waveform and bias the circuit. In the present embodiment, resistor $R_6$ has a value of 100 kΩ, and the capacitor C is a 0.1 µF capacitor. With this implementation, the input of the analog-to-digital converter differs by about 1 volt when a cartridge is present. Analog-to-digital converters incorporated in microprocessors and microcontrollers typically have an eight bit resolution, which enables the converter to detect voltage differences as low as 0.2 volts under ideal conditions. This yields sufficient resolution to detect the presence of a cartridge consistently, from cartridge to cartridge and drive to drive.

As can be appreciated, the comparison can be simplified by basing the threshold value directly on the lower, variable voltage value rather than on the calculated applied voltage, $V_D$. In such a case, if the output of the voltage sensor was less than the threshold value (meaning the applied voltage, $V_D$, was relatively large), the presence of a cartridge would be indicated. This approach eliminates having to calculate the applied voltage $V_D$ by subtracting the voltage sensor output from the fixed, 5 V value.

It should be noted that other spindle motor controller/drivers may achieve an applied voltage, $V_D$, by applying a fixed, low voltage to one coil and then varying the higher voltage on the other coil—i.e., the exact opposite of the technique illustrated in FIGS. 19(a) and 19(b). In such a case, the voltage sensor 262 must be modified so that it outputs the higher, variable voltage.

As the foregoing illustrates, the present invention is directed to methods and apparatus for detecting the presence of a disk cartridge in a data storage device, such as a disk drive. Another aspect of the present invention is directed to a disk drive, and a disk cartridge adapted for use in the disk drive, that employ apparatus for reducing the risk of damage to components of the disk drive, such as the recording heads of the disk drive, as a result of the insertion of an incompatible disk cartridge into the disk drive. The methods and apparatus of the present invention may be employed in any data storage device, and are by no means limited to use in disk drives that employ a movable platform to carry the disk cartridge into a latched position. It is understood, therefore, that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A disk cartridge adapted for insertion into a data storage device having an insertion opening, a spindle motor positioned to engage a hub of the disk cartridge and to rotate a disk within the cartridge upon insertion of the disk cartridge into the data storage device, a spindle motor controller/driver for initiating rotation of the spindle motor, and a cartridge receiving stop having first and second receiving projections formed on a substantially flat middle surface and having angled outer edges that project at a predetermined angle from said substantially flat middle surface toward an insertion opening of the data storage device, said disk cartridge comprising:

an outer casing comprising:
a top surface having a substantially flat middle region and angled peripheral regions;
a substantially flat bottom surface defining an opening;
a back wall having a rear peripheral edge;
a front wall having a front peripheral edge; and
side walls, each of said side walls meeting said front wall to form a plurality of non-square shaped front corners and said side walls meeting said back wall at rear corners;

a first engaging projection formed on said front wall, said first engaging projection adapted to engage the first receiving projection of the cartridge receiving stop;

a second engaging projection formed on said front wall, said second engaging projection adapted to engage the second receiving projection of the cartridge receiving stop; and a disk rotatably mounted in said disk cartridge, a hub of said disk being exposed by said opening, wherein said hub engages said spindle motor upon insertion of said disk cartridge into said data storage device through said insertion opening.

2. The disk cartridge as recited in claim 1, wherein a dimension of said side walls defining a distance between said top surface and said substantially flat bottom surface is formed such that said distance is a substantially similar to a height of said insertion opening, wherein said disk cartridge is adapted to be guided by said insertion opening into said data storage device.

3. The disk cartridge as recited in claim 2, said disk cartridge being adapted to be received by an internal platform of said data storage device, wherein said disk cartridge is received by said internal platform after passing through said insertion opening.

4. The disk cartridge as recited in claim 3, wherein said disk cartridge is adapted to slide said internal platform within said data storage device toward an end of said data storage apparatus opposite said insertion opening, said disk cartridge sliding said internal platform until said hub engages said spindle motor.

5. The disk cartridge recited in claim 2, wherein said non-square shaped front corners are adapted to avoid interference with said angled outer edges of said cartridge receiving stop.

6. The disk cartridge recited in claim 2, wherein said non-square shaped front corners of said outer casing are formed at an angle substantially equal to said predetermined angled formed by said angled outer edges of said cartridge receiving stop.

7. The disk cartridge recited in claim 2, wherein said non-square shape of at least one of said front corners of said outer casing is formed as a notched area.

8. The disk cartridge recited in claim 2, wherein said non-square shape of at least one of said front corners of said outer casing has a concave arc shape.

9. The disk cartridge recited in claim 2, wherein one of said side walls is formed having a groove which extends substantially over a length of said one side wall.

10. The disk cartridge recited in claim 9, wherein said groove extends from one of said front corners of said front wall to a terminating end which is proximate to said back wall.

11. The disk cartridge recited in claim 10, wherein said terminating end is formed at a second predetermined angle with respect to said bottom wall.

12. A disk cartridge adapted for insertion into a data storage device having an insertion opening, a spindle motor positioned to engage a hub of the disk cartridge and to rotate a disk within the cartridge upon insertion of the disk cartridge into the data storage device, a spindle motor controller/driver for initiating rotation of the spindle motor, and a cartridge receiving stop having first and second receiving projections formed on a substantially flat middle surface and having angled outer edges that project at a predetermined angle from said substantially flat middle surface toward an insertion opening of the data storage device, said disk cartridge comprising:

an outer casing comprising:
a top surface having a substantially flat middle region and angled peripheral regions;
a substantially flat bottom surface defining an opening; and
side walls, each of said side walls meeting said front wall to form a plurality of non-square shaped front corners and said side walls meeting said back wall at rear corners, wherein a dimension of said side walls defining a distance between said top surface and said substantially flat bottom surface is formed such that said distance is a substantially similar to a height of said insertion opening; and a disk rotatably mounted in said disk cartridge, a hub of said disk being exposed by said opening, wherein said disk cartridge is adapted to be guided by said insertion opening into said data storage device to engage said hub with said spindle motor.

13. The disk cartridge as recited in claim 12, said disk cartridge being adapted to be received by an internal platform of said data storage apparatus, wherein said disk cartridge is received by said internal platform after passing through said insertion opening.

14. The disk cartridge as recited in claim 13, wherein said disk cartridge is adapted to slide said internal platform within said data storage apparatus toward an end of said data storage apparatus opposite said insertion opening, said disk cartridge sliding said internal platform until said hub engages said spindle motor.

15. The disk cartridge as recited in claim 12, further comprising a first engaging projection formed on said front wall, said first engaging projection adapted to engage the first receiving projection of the cartridge receiving stop; and a second engaging projection formed on said front wall, said second engaging projection adapted to engage the second receiving projection of the cartridge receiving stop.

16. The disk cartridge recited in claim 12, wherein said non-square shaped front corners are adapted to avoid interference with said angled outer edges of said cartridge receiving stop.

17. The disk cartridge recited in claim 12, wherein said non-square shaped front corners of said outer casing are formed at an angle substantially equal to said predetermined angled formed by said angled outer edges of said cartridge receiving stop.

18. The disk cartridge recited in claim 12, wherein said non-square shape of at least one of said front corners of said outer casing is formed as a notched area.

19. The disk cartridge recited in claim 12, wherein said non-square shape of at least one of said front corners of said outer casing has a concave arc shape.

20. The disk cartridge recited in claim 12, wherein one of said side walls is formed having a groove which extends substantially over a length of said one side wall.

* * * * *